(12) United States Patent
Natori et al.

(10) Patent No.: US 8,963,802 B2
(45) Date of Patent: Feb. 24, 2015

(54) PROJECTOR, PROJECTOR SYSTEM, DATA OUTPUT METHOD OF PROJECTOR, AND DATA OUTPUT METHOD OF PROJECTOR SYSTEM

(75) Inventors: Takashi Natori, Suwa (JP); Yoshiharu Konishi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 315 days.

(21) Appl. No.: 13/069,985

(22) Filed: Mar. 23, 2011

(65) Prior Publication Data

US 2011/0234474 A1  Sep. 29, 2011

(30) Foreign Application Priority Data

Mar. 26, 2010  (JP) .................................. 2010-072421
Jan. 12, 2011  (JP) .................................. 2011-003729

(51) Int. Cl.
G09G 5/00 (2006.01)
H04N 9/31 (2006.01)
H04N 5/04 (2006.01)

(52) U.S. Cl.
CPC ............... *H04N 9/3197* (2013.01); *H04N 5/04* (2013.01); *H04N 9/3147* (2013.01)
USPC .......................................... 345/1.3; 345/1.1

(58) Field of Classification Search
USPC .................................. 345/1.1, 1.3
See application file for complete search history.

(56) References Cited

U.S. PATENT DOCUMENTS

| 6,829,664 | B2 * | 12/2004 | Nomizo et al. ................. 710/72 |
| 2001/0056486 | A1 | 12/2001 | Kosaka |
| 2003/0037111 | A1 | 2/2003 | Yoshioka |
| 2005/0071430 | A1 | 3/2005 | Kobayashi et al. |
| 2007/0005809 | A1 | 1/2007 | Kobayashi et al. |
| 2007/0052847 | A1 | 3/2007 | Yamada |
| 2011/0116055 | A1 * | 5/2011 | Nakamura et al. ............. 353/82 |
| 2011/0141380 | A1 * | 6/2011 | Ichimasa .......................... 349/5 |
| 2011/0196918 | A1 | 8/2011 | Kkunigita et al. |

FOREIGN PATENT DOCUMENTS

| CN | 1430410 A | 7/2003 |
| JP | A-11-103319 | 4/1999 |
| JP | A-11-331199 | 11/1999 |
| JP | A-2001-273219 | 10/2001 |
| JP | 2001-356972 | 12/2001 |
| JP | A-2003-91489 | 3/2003 |
| JP | A-2003-91490 | 3/2003 |
| JP | A-2006-221084 | 8/2006 |
| JP | A-2007-072130 | 3/2007 |
| JP | A-2010-015032 | 1/2010 |
| WO | WO 2010/023828 A1 | 3/2010 |

* cited by examiner

*Primary Examiner* — Kwang-Su Yang
(74) *Attorney, Agent, or Firm* — Oliff PLC

(57) ABSTRACT

A projector includes: a data input section which input the data of an image and/or sound; a data output section which outputs the input data; and a data transfer section which captures the data before being output by the data output section, and transfers the captured data to one or more other projectors, wherein the data output section transfers the data by the data transfer section and then outputs the data input from the data input section.

14 Claims, 9 Drawing Sheets

PROJECTOR, PROJECTOR SYSTEM, DATA OUTPUT METHOD OF PROJECTOR, AND DATA OUTPUT METHOD OF PROJECTOR SYSTEM

BACKGROUND

1. Technical Field

The present invention relates to a projector which outputs data of an input image or sound, a projector system, a data output method of the projector, and a data output method of the projector system.

2. Related Art

In the related art, there has been known a projector of this type which includes a data input section which inputs image data and an image data projecting section which projects the input image data (refer to JP-A-2006-221084). Such a projector is used for presentations or the like, and receives the image data from an external device such as a video cassette recorder through the data input section, and projects the image data.

However, for example, in a case where the same image is shown in a plurality of locations such as a plurality of conference rooms or a plurality of branch offices, a projection technique is required in which a projector is installed in each location and the same projection image is shared in the plurality of locations. However, in such a projector, even though the plurality of projectors is prepared, it is difficult to adjust projection timings between the plurality of projectors, and thus, to share the same projection image. In this respect, a technique which adjusts timings using a distributor such as a switcher to input image data may be considered. However, this technique requires a separate device, thereby complicating the configuration of the entire projector system. This is similarly applied to sound outputting.

SUMMARY

An advantage of some aspects of the invention is that it provides a projector, a projector system, a data output method of the projector and a data output method of the projector system which can share the same output sound or projection image in a plurality of locations without a separate device.

According to an aspect of the invention, there is provided a projector which includes a data input section which input the data of an image and/or sound; a data output section which outputs the input data; and a data transfer section which captures the data before being output by the data output section, and transfers the captured data to one or more other projectors. The data output section transfers the data by the data transfer section and then outputs the data input from the data input section.

Further, according to another aspect of the invention, there is provided a projector system which includes a first projector; and one or more second projectors which are connected to the first projector. The first projector includes a data input section which input the data of an image and/or sound; a first data output section which outputs the input data; and a data transfer section which captures the data before being output by the first data output section, and transfers the data to the one or more second projectors. The one or more second projectors each includes a data receiving section which receives the data transferred from the first projector; and a second data output section which outputs the data after receiving the data. The first data output section transfers the data by the data transfer section and then outputs the data input from the data input section.

Further, according to still another aspect of the invention, there is provided a data output method of a projector system using a first projector and one or more second projectors which are connected with the first projector, the method including: in the first projector, inputting data of an image and/or sound; outputting the input data; capturing the data before being output in the outputting of the data, and transferring the captured data to the one or more second projectors, and in each of the one or more second projectors, receiving the data transferred from the first projector; and outputting the data after the receiving of the data. In the outputting of the input data in the first projector, the data input in the inputting of data is output after the data is transferred in the capturing and transferring of the data.

According to these configurations, since the data before being output from one projector to the other projectors is transferred and the projectors output the data, it is possible to share the same output sound and projection image in a plurality of locations, without a separate device. Particularly, by transferring the data through a network, it is possible to share the output sound and projection image in distant locations. Further, since the data output is performed by the data output section after the data is transferred, it is possible to suppress a time lag of the output timings due to the capture and the data transmission. The data output of the image through the data output section or the data outputting process means the projection of the data. Further, the data transfer method of the image data may use a wireless communication or a wired communication. Here, "capture" means to import the image data (still image data or moving image data) and/or sound data. That is, the moving image data is cut out in the frame unit for sampling to be captured.

This projector may further include a temporary storage section which temporarily stores the input data, and the data output section may delay the data stored in the temporary storage section to be output by a predetermined time.

According to this configuration, the projector temporarily stores the input data, and delays (shifts) the output timing for a predetermined time to be output, and thus, it is possible to reduce the time lag of the output timings in one projector and the other projectors.

This projector may further include: a synchronization signal transmitting and receiving section which transmits a synchronization signal for calculating a time taken for data transmission to the one or more other projectors, and receives a response signal for the synchronization signal from the one or more other projectors to which the synchronization signal is transmitted; a transmission and reception time obtaining section which obtains a transmission and reception time taken from the transmission of the synchronization signal to the reception of the response signal to the one or more other projectors; and a synchronization adjustment time calculating section which calculates a synchronization adjustment time for synchronizing the data output from the one or more other projectors, on the basis of the obtained transmission and reception time. The data output section may delay the data stored in the temporary storage section using the maximum time out of all the synchronization adjustment times calculated by the synchronization adjustment time calculating section as the predetermined time, to be output. When a time obtained by subtracting the synchronization adjustment time of the other projectors which are transfer destinations from the maximum time elapses, at the time of the transfer of the data to the one or more other projectors, the data transfer section may transfer the data to the other projectors which are the transfer destinations.

Further, in the projector system, the first projector may further include: a temporary storage section which temporarily stores the input data; a synchronization signal transmitting and receiving section which transmits a synchronization signal for calculating a time taken for the data transmission to the one or more second projectors, and receives a response signal for the synchronization signal from the one or more second projectors to which the synchronization signal is transmitted; a transmission and reception time obtaining section which obtains a transmission and reception time taken from the transmission of the synchronization signal to the reception of the response signal to the one or more second projectors; and a synchronization adjustment time calculating section which calculates a synchronization adjustment time for synchronizing the data output from the one or more second projectors, on the basis of the obtained transmission and reception time. The first data output section may delay the data stored in the temporary storage section by the maximum time out of all the synchronization adjustment times calculated by the synchronization adjustment time calculating section, to be output. When a time obtained by subtracting the synchronization adjustment time of the second projectors which are transfer destinations from the maximum time elapses, at the time of the transfer of the data to the one or more second projectors, the data transfer section may transfer the data to the second projectors which are the transfer destinations.

Further, according to yet another aspect of the invention, there is provided a data output method of a projector which can be connected with one or more other projectors, the method including: inputting data of an image and/or sound; outputting the input data; capturing the data before being output in the data outputting process, and transferring the captured data to the one or more other projectors; temporarily storing the input data in a temporary storage section; transmitting a synchronization signal for calculating a time taken for the data transmission to the one or more other projectors, and receiving a response signal for the synchronization signal from the one or more other projectors to which the synchronization signal is transmitted; obtaining a transmission and reception time from the transmission of the synchronization signal to the reception of the response signal to the one or more other projectors; and calculating a synchronization adjustment time for synchronizing the data output from the one or more other projectors on the basis of the obtained transmission and reception time. The data stored in the temporary storage section is delayed by the maximum time out of all the synchronization adjustment times calculated in the calculating of a synchronization adjustment time, to be output, in the outputting of the input data. When a time obtained by subtracting the synchronization adjustment time of the other projectors which are transfer destinations from the maximum time elapses, at the time of the transfer of the data to the one or more other projectors, the data is transferred to the other projectors which are the transfer destinations in the capturing and transferring of the data.

According to these configurations, the time (data transmission time) taken for the data transmission which becomes the cause of the time lag of the data outputs in the respective projectors is obtained on the basis of the time taken for the data transmission and reception between one projector (first projector) and the other projectors (second projectors), to calculate the synchronization adjustment time in consideration of the time. Further, the data output from one projector is delayed by the maximum time out of all the calculated synchronization adjustment times, and the data is transmitted while delaying the transmission timing in the descending order of the synchronization adjustment time to the other projectors. Thus, in a case where the data is transferred to one or more other projectors, since the reception of the data is completed approximately at the same time in the one or more other projectors and one projector outputs the data at the timing when the one or more other projectors completely receive the data, it is possible to adjust the data output from all the projectors to be synchronized. That is, it is possible to reduce the time lag of the data outputs from all the projectors. Further, since only one projector performs the processes and the other projectors do not necessarily perform a separate process, it is possible to simplify the processes.

The above-described synchronization adjustment time may be a time in which a data processing time (for example, a time taken for a decompressing process of the received data, various image processes, various sound processes, or the like) or the like in the other projectors in addition to the data transmission time is considered.

The projector may further include a synchronization signal transmitting and receiving section which transmits a synchronization signal for calculating a time taken for the data transmission to the one or more other projectors, and receives a response signal for the synchronization signal from the one or more other projectors to which the synchronization signal is transmitted; a transmission and reception time obtaining section which obtains a transmission and reception time taken from the transmission of the synchronization signal to the reception of the response signal to the one or more other projectors; and a synchronization adjustment time calculating section which calculates a synchronization adjustment time for synchronizing the data output from the one or more other projectors, on the basis of the obtained transmission and reception time. The data output section may delay the data stored in the temporary storage section using the maximum time out of all the synchronization adjustment times calculated by the synchronization adjustment time calculating section as the predetermined time, to be output. At the time of the transfer of the data to the one or more other projectors, the data transfer section may transfer a time obtained by subtracting the synchronization adjustment time of the other projectors which are transfer destinations from the maximum time as synchronization time information, in addition to the data, to the other projectors which are the transfer destinations.

Further, in the projector system, the first projector may further include: a temporary storage section which temporarily stores the input data; a synchronization signal transmitting and receiving section which transmits a synchronization signal for calculating a time taken for the data transmission to the one or more second projectors, and receives a response signal for the synchronization signal from the one or more second projectors to which the synchronization signal is transmitted; a transmission and reception time obtaining section which obtains a transmission and reception time taken from the transmission of the synchronization signal to the reception of the response signal to the one or more second projectors; and a synchronization adjustment time calculating section which calculates a synchronization adjustment time for synchronizing the data output from one or more second projectors, on the basis of the obtained transmission and reception time. The first data output section may delay the data stored in the temporary storage section by the maximum time out of all the synchronization adjustment times calculated by the synchronization adjustment time calculating section, to be output. At the time of the transfer of the data to the one or more second projectors, the data transfer section may transfer a time obtained by subtracting the synchronization adjustment time of the second projectors which are transfer destinations from the maximum time as synchronization time information, in addition to the data, to the second projectors which are the transfer destinations. The data receiving section of the one or more second projectors may receive the data and the synchronization time information, and the second data output section may output the data after a time indicated by the received synchronization time information elapses.

According to these configurations, one projector (first projector) transmits the data and the synchronization time information to one or more other projectors (second projectors), and the one or more other projectors adjust the output timing in consideration of the synchronization time information, and thus, it is possible to reduce the time lag of the data outputs from all the projectors. That is, each of the other projectors delays the data output by the time (synchronization time information) until a different projector completely receives the data, and thus, it is possible to adjust the data outputs from all the projectors to be synchronized, and to reduce the time lag of the data outputs. Further, since one projector only has to transmit the synchronization time information together with the image or sound data to the other projectors, it is possible to simplify the processes, without a complicated process. Even in a case where the number of the other projectors which becomes the transfer destination is large, it is possible to reduce the processing load of one projector, compared with the case where one projector performs all the processes (processes for the synchronization adjustment) as described above.

In this projector, the synchronization adjustment time calculating section may calculate half the obtained transmission and reception time as the synchronization adjustment time.

According to this configuration, as the synchronization adjustment time is set to half the transmission and reception time, it is possible to simply calculate the synchronization adjustment time (time taken for the data transmission (data transfer) to one or more other projectors), without a complicated calculation, even in a case where speeds are different, compared with a case where the speeds are the same in both directions of a network which connects one projector with one or more other projectors.

In this projector, the synchronization signal transmitting and receiving section may perform the transmission and reception of the synchronization signal and the response signal at a predetermined time interval, and the transmission and reception time obtaining section may obtain the transmission and reception time whenever transmission and reception is performed by the synchronization signal transmitting and receiving section. Further, the synchronization adjustment time calculating section may calculate the synchronization adjustment time on the basis of the transmission and reception time whenever the transmission and reception time is obtained.

According to this configuration, the transmission and reception of the synchronization signal is performed at the predetermined time interval, and the synchronization adjustment time is recalculated in each case. Thus, for example, during the projector is in use (when the image or sound are synchronized and output between the plurality of projectors), even if a delay is generated at the data output timing due to some causes (network load, situation change, or the like), it is possible to perform an appropriate correction. As a result, it is possible to suppress the delay of the timing of the image projection or sound output between the plurality of projectors. Since frequent calculation of the synchronization adjustment time applies load to the projector processes or the network, the interval of calculating the synchronization adjustment time may be a relatively long time (for example, 10 minutes or 30 minutes).

The projector may further include a timing setting section which sets the predetermined time interval. The synchronization signal transmitting and receiving section performs the transmission and reception of the synchronization signal and the response signal, at the time interval which is set by the timing setting section.

According to this configuration, since the user can adjust the time according to usage environments of the projectors (usage times, network environments, or the like of the projectors) or preferences of the user, it is possible to enhance user convenience. As a setting method, a user may directly input time for setting, or the user may select time from a predetermined setting time list (10 minutes, 15 minutes, 30 minutes, or the like) for setting.

The projector may further include a synchronization manipulation section which manipulates performance of the transmission and reception of the synchronization signal and the response signal. Here, the synchronization signal transmitting and receiving section may perform the transmission and reception of the synchronization signal and the response signal using the manipulation of the synchronization manipulation section as a trigger, and the transmission and reception time obtaining section may obtain the transmission and reception time whenever the transmission and reception is performed by the synchronization signal transmitting and receiving section in which the manipulation of the synchronization manipulation section is used as the trigger. The synchronization adjustment time calculating section may calculate the synchronization adjustment time on the basis of the transmission and reception time whenever the transmission and reception time is obtained.

According to this configuration, the transmission and reception of the synchronization signal is performed at an arbitrary timing (timing when the synchronization manipulation section is manipulated), and the synchronization adjustment time according to the transmission and reception can be calculated. For example, when a user uses the projector, since the user can correct the output timings to be synchronized by manipulating the synchronization manipulation section, in a case where the user feels that there is a delay in the image output (sound output) in the respective projectors, or in like cases, it is possible to enhance user convenience.

In this projector, the one or more other projectors may project the data in conjunction with the reception of the data from the projector.

According to this configuration, since the one or more other projectors perform the data output in conjunction with the data reception, the data outputs of one projector and the other projector are in conjunction centered around the data transfer. Thus, it is possible to share the output sound and the projection image in real time.

The projector may further include a transfer switching section which switches the transfer of the data through the data transfer section.

According to this configuration, since the transfer switching section is provided, it is possible for a user to appropriately switch whether to transfer the data or not. Thus, it is possible for the user to simply and appropriately select the process of performing the sound output or the image projection by only the projector and the process of performing the sound output or the image projection by the plurality of projectors.

In this projector, the data input section may include an analog signal input section which inputs the data by an analog signal, and a digital signal input section which inputs the data by a digital signal. Further, the projector may further include a digital converting section which converts the data input by the analog signal into a digital signal.

According to this configuration, since the data input by the analog signal can be converted into the digital signal by the digital converting section, it is possible to transfer the data input by the analog signal. Thus, it is possible to share the data in the data input by the analog signal, in addition to the data input by the digital signal.

The projector may further include a data compressing section which compresses the data before the data is transferred through the data transfer section.

According to this configuration, since the data is compressed and transferred, it is possible to enhance the data transfer speed. Further, since the data output section outputs the data after the data is captured, compressed and transferred, it is possible to further reduce the time lag of the output timing.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
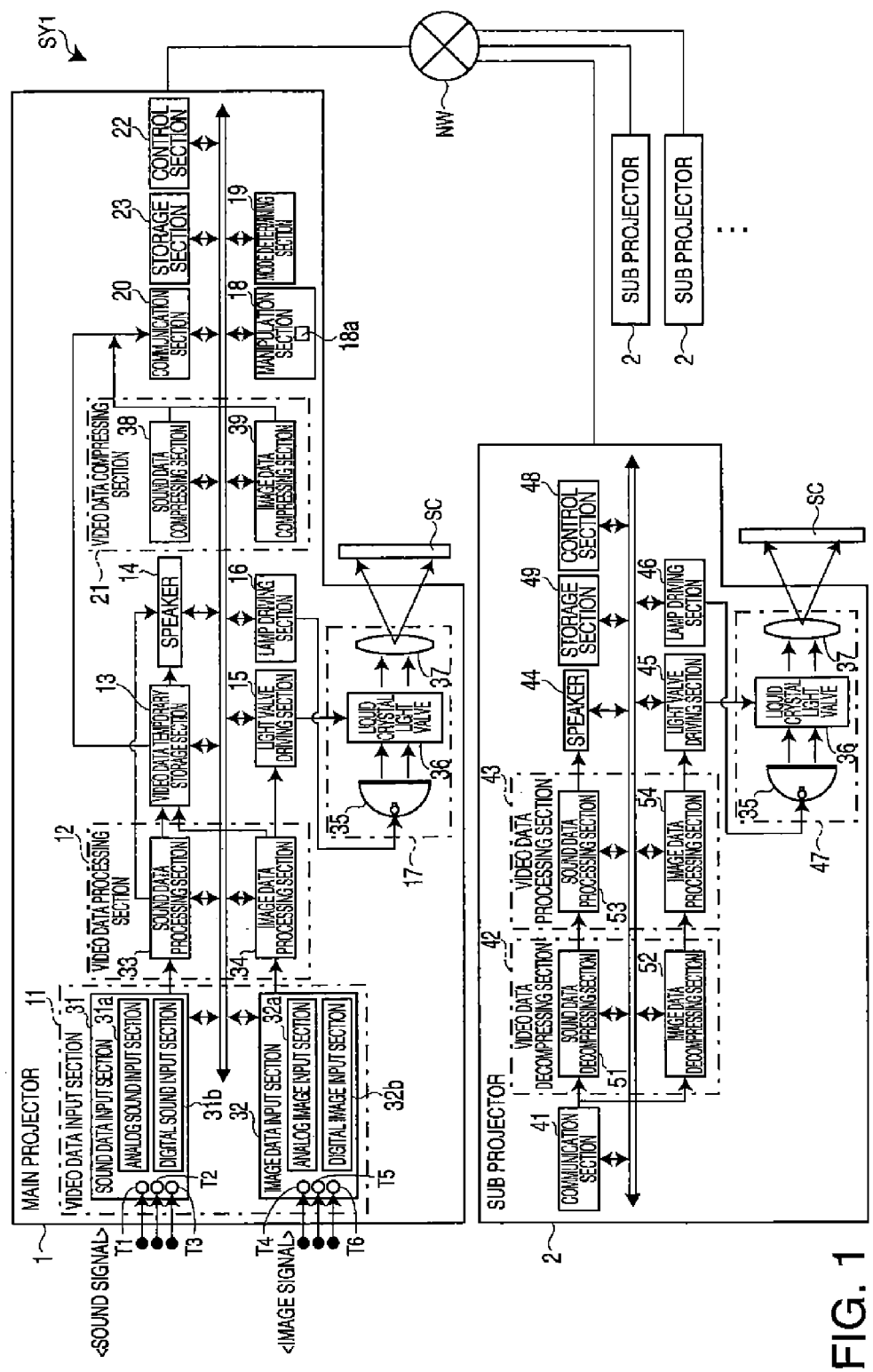
FIG. 1 is a block diagram illustrating a configuration of a projector system according to a first embodiment of the invention.

Hereinafter, a projector system which uses projector according to the invention and a data output method thereof will be described with reference to the accompanying drawings. As shown in FIG. 1, a projector system SY1 according to a first embodiment includes a main projector 1 (projector, first projector) and a plurality of sub projectors 2 (other projectors, second projectors) connected to the main projector 1 through a network NW (a state where three or more sub projectors 2 are connected is exemplified in FIG. 1). The main projector system SY1 transfers image data which is projected onto the main projector 1 and sound data which is synchronized with the projection of the image data to be output as sound (hereinafter, data obtained by synchronizing the image data with the sound data in synchronization with the image data to be output is referred to as "video data") to each sub projector 2 to share the projection image and the sound between the main projector 1 and each sub projector 2.

The main projector 1 and each sub projector 2 are arranged in different locations, for example, the main projector 1 is disposed in a location in Tokyo, the first sub projector 2 is disposed in a location in Osaka, and the second sub projector 2 is disposed in a location in Nagoya. Although not shown, the connection between the respective projectors 1 and 2 and the network NW is performed by wireless communication through an access point. Further, the image data described in the first embodiment may be moving image data or still image data.

The main projector 1 includes a video data input section 11 (data input section), a video data processing section 12 (digital converting section), a video data temporary storage section 13, a speaker 14 (data output section, first data output section), a light valve driving section 15, a lamp driving section 16, a projection optical section 17, a manipulation section 18, a mode determining section 19, a communication section 20, a video data compressing section 21 (data compression section), a control section 22 which controls the above sections, and a storage section 23 which stores a variety of data used in controlling.

The video data input section 11 includes a sound data input section 31 and an image data input section 32. The sound data input section 31 receives a variety of sound data from an external device, and includes an analog signal sound input section 31a (analog signal input section) which receives sound data by an analog signal, and a digital signal sound input section 31b (digital signal input section) which receives sound data by a digital signal. That is, the sound data input section 31 is configured to receive the analog sound signal and the digital sound signal. Specifically, the sound data input section 31 receives a variety of sound data of the analog signal or the digital signal, from the external device such as a personal computer, a CD player, a microphone, or a USB memory, and includes a plurality of sound input terminals T1, T2, and T3 such as an AV terminal or a USB terminal.

On the other hand, the image data input section 32 receives a variety of image data from the external device, and includes an analog image input section 32a (analog signal input section) which receives image data by an analog signal, and a digital image input section 32b (digital signal input section) which receives image data by a digital signal. That is, the image data input section 32 is configured to receive the analog image signal (RGB signal, composite image signal, or the like) and the digital image signal. Specifically, the image data input section 32 receives a variety of image data from the external device such as a personal computer, a video player, a document camera, or a USB memory, and includes a plurality of image input terminals T4, T5 and T6 such as an AV terminal or a USB terminal. The sound data input section 31 and the image data input section 32 may be configured by a common input terminal.

The video data processing section 12 includes a sound data processing section 33 and an image data processing section 34. The sound data processing section 33 performs a process of adjusting output characteristics for the input sound data. Further, the sound data processing section 33 converts the sound data of the analog signal into the sound data of the digital signal.

The image data processing section 34 performs a predetermined image processing for the input image data. Specifically, a keystone distortion correcting process, an image quality adjusting process, an image size adjusting process, a gamma correcting process, an image composing (superposing) process, and the like are performed. Further, the image data processing section 34 converts the image data of the analog signal into the image data of the digital signal.

The video data temporary storage section 13 temporarily stores the video data (sound data and image data) processed in the video data processing section 12. Here, the video data of the digital signal is stored.

The speaker 14 outputs the sound data processed in the sound data processing section 33 or the sound based on the sound data stored in the image data temporary storage section 13. A sound output terminal for connection with a sound output device may be provided in addition to the speaker 14, and the sound may be selectively output from the speaker 14 and the sound output device.

The light valve driving section 15 is a liquid crystal driver, and sets light transmission rate of each pixel by applying a driving voltage according to the image data to each pixel of a liquid crystal light valve 36 which will be described later.

The lamp driving section 16 includes an igniter section which generates a high voltage in order to light a light source lamp 35 (which will be described later) which is a discharge light emitting lamp to form a discharge circuit, and a ballast circuit which maintains a stable lighting state after the light source lamp 35 is lit (both are not shown here). As the light source lamp 35, an extra high pressure mercury lamp, a metal halide lamp, a xenon lamp, or the like can be employed. Further, in addition to the discharge light emitting lamp, a variety of self light emitting elements such as a light emitting diode, an organic EL element, a silicone light emitting element, or the like may be applied.

The projection optical section 17 projects and displays an image on a screen SC, and includes the light source lamp 35, three liquid crystal light valves 36 corresponding to three primary colors, and a projection lens 37. The image projection through the projection optical section 17 is performed on the basis of the image data processed in the image data processing section 34 or the image data stored in the video data temporary storage section 13. Each liquid crystal light valve 36 is formed by a liquid crystal display panel in which liquid crystal is disposed in a sealed manner between a pair of transparent substrates, or the like. On an inner surface of each transparent substrate, transparent electrodes (pixels) capable of applying a driving voltage to the liquid crystal for every minute region are formed in a matrix shape.

The illumination light emitted from the light source lamp 35 is split into color lights of R, G, and B, using a light splitting optical system (not shown), and then passes through the liquid crystal light valve 36 for each color, and thus, light modulation is performed according to the image data. Further, the modulated image light is composed for every pixel by a light composition optical system (dichroic prism or the like, not shown) to be color-imaged, and the image light which is color-imaged is projected by the projection lens 37, and thus, the projection image is displayed on the screen SC. That is, the image data is projected on the screen SC using the light valve driving section 15, the lamp driving section 16, and the projection optical section 17 (data output section, first data output section).

Although described in detail later, when the above-described image projection and sound output are performed, in a case where a mode of the main projector 1 is set as a "sharing mode", the video data (sound data and image data) after being processed through the video data processing section 12 is temporarily stored in the video data temporary storage section 13, and the video data in the video data temporary storage section 13 is transferred to the sub projector 2, and then, the image projection and the synchronized sound output are performed in the main projector 1.

The manipulation section 18 includes a manipulation panel which is provided in a main body of the main projector 1 or a remote controller (both are not shown), through which a user performs a variety of settings and manipulations. The manipulation section 18 includes a mode switch 18a which switches the mode of the main projector 1 between a "single mode" and a "sharing mode". In the "single mode", image data is projected by the single main projector 1, and sound based on the sound data is output by the single main projector 1. On the other hand, in the "sharing mode", the image data projected and the sound data output by the main projector 1 are transferred to the plurality of sub projectors 2, and the projection image and output sound are shared. That is, the transfer of the video data (image data and sound data) is switched by the mode switch 18a (transfer switching section).

The mode determining section 19 selectively determines the mode according to the manipulation of the mode switch 18a. That is, the mode determining section 19 switches the mode between the "single mode" and the "sharing mode" for determination, according to the manipulation of the mode switch 18a.

The communication section 20 is a network interface for performing communication, for example, a wireless LAN communication corresponding to a wireless LAN standard such as IEEE802.11a, IEEE802.11b, or IEEE802.11g, with the sub projector 2. In a case where the mode of the main projector 1 is the "sharing mode", the control section 22 captures the video image before outputting and temporarily stores the captured video image in the video data temporary storage section 13, and transfers the temporarily stored video data to the plurality of sub projectors 2 through the communication section 20. "Capture" means that the control section 22 imports the data (video data) before outputting and stores the data in the video data temporary storage section 13. Further, as the communication method, a wired LAN may be used for communication with the sub projector 2, instead of the above-described wireless communication. A data transfer section described in the Claims uses the control section 22 and the communication section 20 as the main components.

The video data compressing section 21 includes a sound data compressing section 38 and an image data compressing section 39. The sound data compressing section 38 compresses the sound data included in the video data, before the transfer of the video data. The image data compressing section 39 compresses the image data included in the video data, before the transfer of the video data. That is, the compressed video data (compressed sound data and compressed image data) is transferred to the sub projector 2.

In the above description, the video data (data in which the image data and the sound data correspond to each other to be synchronized with each other) obtained by synchronizing the image data with the sound data is transmitted to the sub projector 2, but the image data and the sound data may be individually transferred. Further, only the image data may be transferred, or only the sound data may be transferred.

On the other hand, the sub projector 2 includes a communication section 41 (data receiving section), a video data decompressing section 42, a video data processing section 43, a speaker 44 (second data output section), a light valve driving section 45, a lamp driving section 46, a projection optical section 47, a control section 48 which controls these sections, and a storage section 49 which stores a variety of data used in the control. The speaker 44, the light valve driving section 45, a lamp driving section 46 and the projection optical section 47 (second data output section) have the same configuration as the respective sections of the main projector 1, and thus, detailed description thereof will be omitted.

The communication section 41 is a network interface for performing communication with the main projector 1, and receives video data (compressed video data) transferred from the main projector 1. The video data decompressing section 42 includes a sound data decompressing section 51 and an image data decompressing section 52. The sound data decompressing section 51 decompresses the compressed sound data included in the received video data. Further, the image data decompressing section 52 decompresses the compressed image data included in the received video data.

The image data processing section 43 includes a sound data processing section 53 and an image data processing section 54. The sound data processing section 53 performs a process of adjusting output characteristics with respect to the decompressed sound data. The image data processing section 54 performs image processing according to projection characteristics of the sub projector 2 for the decompressed image data. The sub projector 2 projects the image on the screen SC by the light valve driving section 45, the light driving section 46 and the projection optical section 47, on the basis of the video data processed in the video data processing section 43, and performs sound output from the speaker 44 in synchronization with the image projection.

Next, an image projection process and a sound output process (these are referred to as "video output process") of a projector system SY1 will be described with reference to a flowchart in FIG. 2. This process is performed as video data (image data and sound data) is input from an external device by the video data input section 11 of the main projector 1. Further, a mode is determined in advance by the mode determining section 19.

Figure 2:
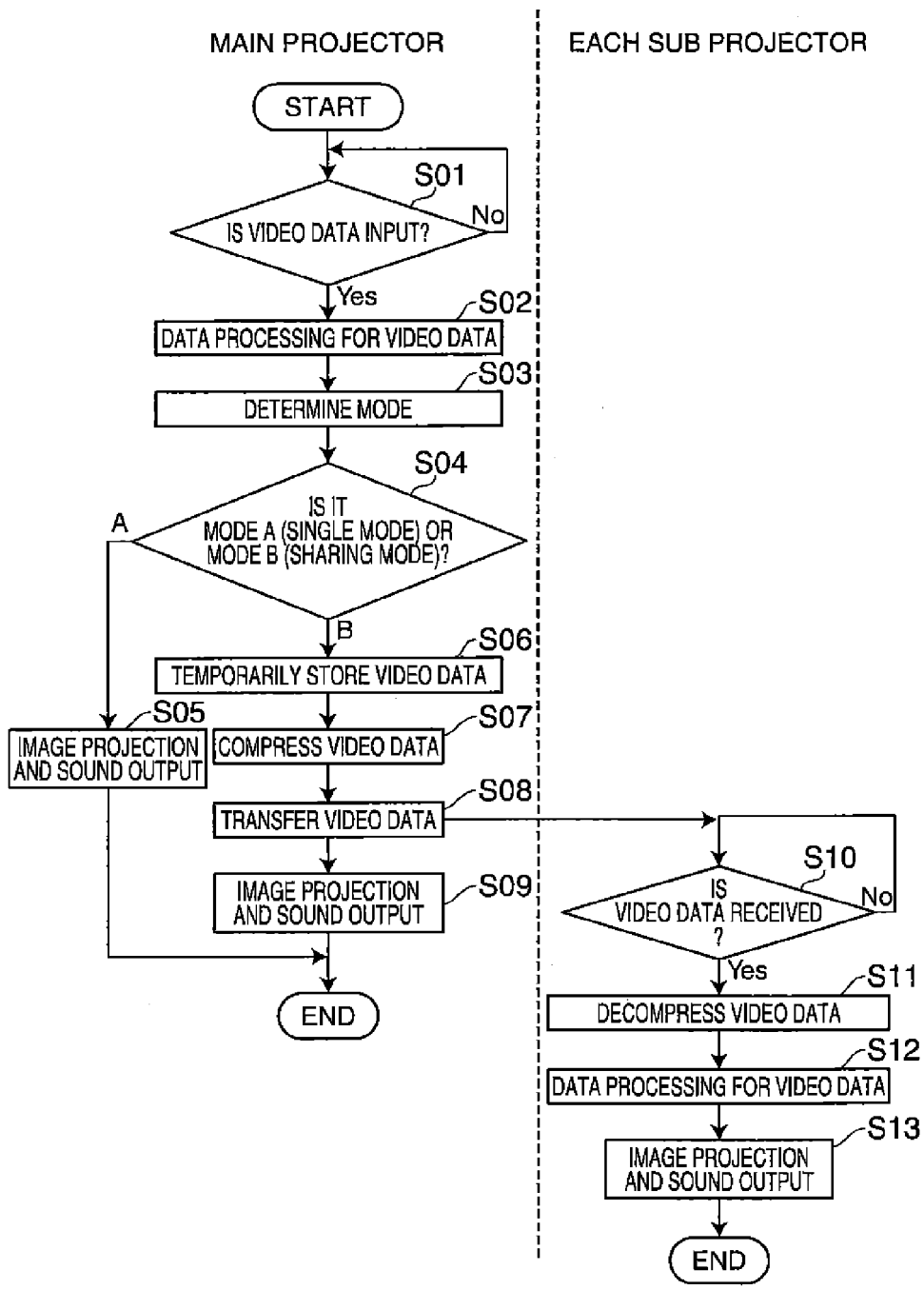
FIG. 2 is a flowchart illustrating a video projection operation in the projector system according to the first embodiment of the invention.

As shown in FIG. 2, if the video data is input from the external device (S01: Yes, data input process), the main projector 1 (control section 22) performs data processing for the video data by the video data processing section 12 (S02). Specifically, the image data processing section 34 performs the process of converting the image data of the analog signal into the image data of the digital signal and the predetermined image processing, and the sound data processing section 33 performs the process of converting the sound data of the analog signal into the sound data of the digital signal and the adjustment of the output characteristics.

Next, after the data processing is performed in S02, the main projector 1 determines the mode set for itself (S03). As a result, in a case where the mode is determined as the "single mode" (S04: A), the main projector 1 projects the image data after being processed onto the screen SC by the light valve driving section 15, the lamp driving section 16 and the projection optical section 17, and outputs the sound based on the sound data after being processed from the speaker 14 in synchronization with the image projection (S05). Thus, the video output process is terminated.

On the other hand, in a case where the mode is determined as the "sharing mode" (S04: B), the main projector 1 captures the video data after being processed and temporarily stores the captured video data in the video data temporary storage section 13 (S06). Thereafter, the main projector 1 compresses the video data stored in the video data temporary storage section 13 (image compression and sound compression) by the video data compressing section 21 (S07), and transfers the compressed video data to the plurality of sub projectors 2 through the communication section 20 (S08, data transfer process). Further, after the video data is transferred, the main projector 1 projects the video data stored in the video data temporary storage section 13 onto the screen SC, by the light valve driving section 15, the lamp driving section 16, and the projection optical section 17, in conjunction with the transfer of the video data, and outputs the sound based on the sound data stored in the video data temporary storage section 13 from the speaker 14, in synchronization with the image projection (S09, first data output process).

On the other hand, if the video data is received from the main projector 1 (S10: Yes, data receiving process), immediately thereafter, each sub projector 2 decompresses the video data by the video data decompressing section 42 (S11), and performs the data processing for the decompressed video data by the video data processing section 43 (S12). Then, each sub projector 2 projects the image data after being processed onto the screen SC by the light valve driving section 45, the lamp driving section 46, and the projection optical section 47, and outputs the sound based on the sound data after being processed from the speaker 44, in synchronization with the image projection (S13, second data output process). Thus, this video output process is terminated.

As described above, according to the first embodiment of the invention, since the video data before outputting (image data before projection and sound data before outputting) is transferred to the plurality of sub projectors 2 from the main projector 1 and the data is projected and output by all the projectors 1 and 2, it is possible to share the same projection image and sound in a plurality of locations, without a separate device. Particularly, as the video data is transferred through the network NW, it is possible to share the projection image and sound in distant locations. Further, since the image projection or the sound output on the side of the main projector 1 is performed after the video data is transferred to the sub projector 2, it is possible to suppress a time lag of output timings due to the capture of the video data and the data transmission. As a result, each sub projector 2 can perform the image projection and the sound output of the same contents, in conjunction with the image projection and the sound output of the main projector 1 (approximately at the same time).

Further, as the data output is performed in conjunction with the data reception using each sub projector 2, the data outputs of the main projector 1 and the sub projector 2 are in conjunction centered around the data transfer, and thus, it is possible to share the output sound and the projection image in real time.

Further, since the mode switch 18a is provided to switch whether to transfer the image data or not, it is possible for a user to appropriately switch whether to transfer the data or not. Thus, it is possible for the user to simply and appropriately select the process of performing the image projection or the sound output using only the main projector 1 and the process of performing the image projection or the sound output using the plurality of projectors 1 and 2, through only a switching manipulation of the switch (one touch).

Further, since the data (image data and sound data) input by the analog signal can be converted into the digital signal, using the video data processing section 12 (the sound data processing section 33 and the image data processing section 34), the data input by the analog signal can be transferred.

Thus, it is also possible to realize data sharing in the data input by the analog signal, in addition to the data input by the digital signal.

Furthermore, as the data is compressed and transferred by the video data compressing section 21 (sound data compressing section 38 and the image data compressing section 39), it is possible to enhance the data transfer speed.

Second Embodiment

Figure 3:
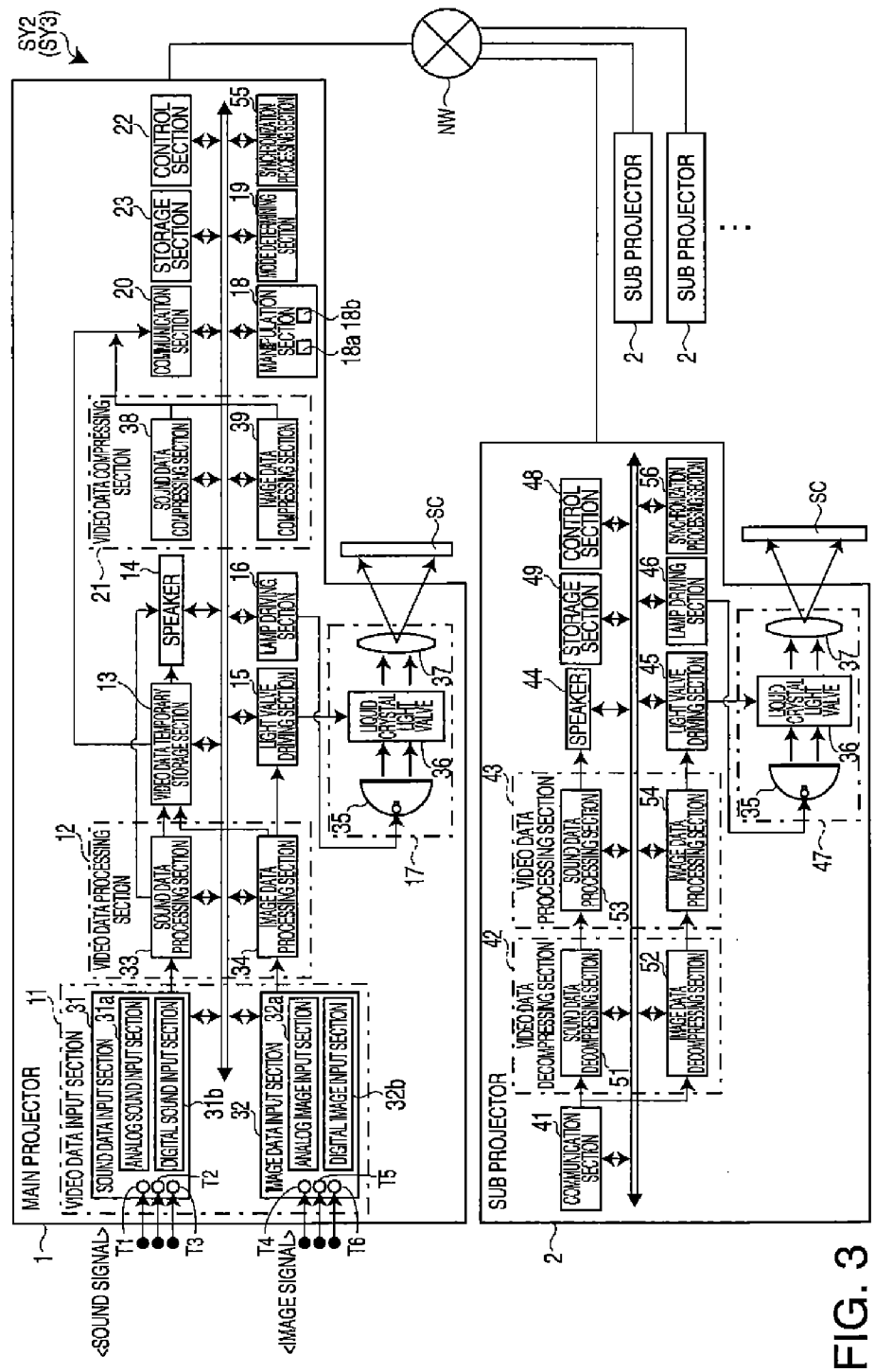
FIG. 3 is a block diagram illustrating a configuration of a projector system according to a second embodiment and a third embodiment of the invention.

Next, a video output process (image projection process and sound output process) in a projector system SY2 according to a second embodiment of the invention will be described with reference to FIGS. 3 to 6. FIG. 3 is a control block diagram illustrating the projector system SY2 according to the second embodiment. A basic configuration thereof is the same as the projector system SY1 (see FIG. 1) according to the first embodiment, but it is different from the first embodiment in that synchronization processing sections 55 and 56 are further provided to the main projector 1 and the sub projector 2, and the main projector 1 adjusts an output timing of the video data of the main projector 1 by the operations of the respective sections and adjusts a transfer timing of the video data to each sub projector 2 to synchronize timings of the image projection and the sound output in the main projector 1 and each sub projector 2. The other configurations of the second embodiment are the same as in the first embodiment.

In FIG. 3, the same elements as in the first embodiment are given the same reference numerals described in FIG. 1, and detailed description thereof will be omitted. Further, modifications applied to the same configuration as in the first embodiment are similarly applied to the present embodiment. Hereinafter, the differences in configurations will be mainly described.

As shown in FIG. 3, the main projector 1 further includes a synchronization processing section 55 and a synchronization switch 18b (synchronization manipulation section). The synchronization processing section 55 performs a process of suppressing the time lag of video outputs in the main projector 1 and each sub projector 2, that is, a process (synchronization process) of synchronizing video output timings (image projection timing and sound output timing). Specifically, a predetermined signal (synchronization signal) is transmitted to each sub projector 2, and a response signal is received from each sub projector 2. Further, on the basis of the time (transmission and reception time) to the reception of the response signal from the transmission of the synchronization signal, the time (synchronization adjustment time) taken for the data transmission to each sub projector 2 is calculated. In the projector system SY2 according to the second embodiment, the transfer timing of the video data to each sub projector 2 and the output timing of the video signal of the main projector 1 are adjusted on the basis of the synchronization adjustment time, and the output timings of the video data in all the projectors 1 and 2 are synchronized with each other.

The synchronization switch 18b is a switch for manually performing a process through the synchronization processing section 55, and is included in one of the components of the manipulation section 18 (a switch on a manipulation panel or a switch on a remote controller). If a user manipulates the synchronization switch 18b at an arbitrary timing, the main projector 1 performs the synchronization process using the manipulation as a trigger.

On the other hand, the sub projector 2 further includes a synchronization processing section 56. This synchronization process section 56 performs a process of synchronizing the video data output timings in all the projectors 1 and 2, in cooperation with the synchronization processing section 55 of the above-described main projector 1. In the projector system SY2 according to the second embodiment, in a case where the synchronization signal transmitted from the main projector 1 is received, a response signal for the synchronization signal is transmitted (returned).

Next, functions in the synchronization process of the main projector 1 and the sub projector 2 will be described with reference to a functional block diagram of FIG. 4. The main projector 1 includes a main synchronization signal transmitting and receiving unit 61 (synchronization signal transmitting and receiving section), a transmission and reception time obtaining unit 62 (transmission and reception time obtaining section), a synchronization time calculating unit 63 (synchronization adjustment time calculating section), a video data transfer unit 64 (data transfer section), and a main video data output unit 65 (data output section, first data output section). The main synchronization signal transmitting and receiving unit 61 includes the synchronization processing section 55 and the communication section 20 as the main components, transmits the synchronization signal to each sub projector 2, and receives the response signal for the transmitted synchronization signal from each sub projector 2.

The transmission and reception time obtaining unit 62 includes the synchronization processing section 55 as a main component, and obtains the time from the transmission of the synchronization signal to the reception of the response signal. That is, the transmission and reception time obtaining unit 62 obtains the transmission and reception time between each sub projector 2 and the main projector 1. The synchronization time calculating unit 63 includes the synchronization processing section 55 as a main component, and calculates the time (synchronization adjustment time) taken for the data transmission to each sub projector 2, on the basis of the transmission and reception time of the sub projectors 2 obtained by the transmission and reception time obtaining unit 62. In this embodiment, the time which is half the transmission and reception time (transmission and reception time/2) is calculated as the synchronization adjustment time.

The video data transfer unit 64 includes the synchronization processing section 55 and the communication section 20 as the main components, and adjusts the transfer timing of the video data to each sub projector 2. Specifically, the longest synchronization adjustment time (maximum synchronization adjustment time) among synchronization adjustment times calculated for the sub projectors 2 is extracted, and the time obtained by subtracting the synchronization adjustment time calculated for each sub projector 2 from the maximum synchronization adjustment time is used as a waiting time (transfer waiting time) when the video data is transferred to each sub projector 2. Further, when the transfer waiting time elapses, the video data is transmitted to each sub projector 2. That is, with respect to the sub projector 2 in which the synchronization adjustment time is the maximum, the transfer of the video data is performed immediately after the synchronization adjustment time is calculated. With respect to the different sub projector 2, the transfer of the video data is started when "maximum synchronization adjustment time− synchronization adjustment time of each sub projector 2" elapses. That is, the video data is transferred with the timing being delayed in the descending order of the synchronization adjustment time, in other words, in the descending order of the data transfer time to the sub projectors 2. Thus, in all the sub projectors 1 and 2, the video data is received at the same time.

The main video data output unit 65 includes the synchronization processing section 55, the light valve driving section 15, the lamp driving section 16, the projection optical section 17, and the speaker 14 as the main components, and adjusts the video output timing from the main projector 1. Specifically, when the above-described extracted maximum synchronization adjustment time elapses, the video data is output (image projection and sound output). That is, when all the sub projectors 2 completely receive the video data, the video data is output from the main projector 1.

On the other hand, the sub projector 2 includes a sub synchronization signal transmitting and receiving unit 71, a video data receiving unit 72 (data receiving section), and a sub video data output unit 73 (second data output section). The sub synchronization signal transmitting and receiving unit 71 includes the synchronization signal processing section 56 and the communication section 41 as the main components, receives the synchronization signal transmitted from the main projector 1, and transmits (returns) the response signal for the received synchronization signal. The video data receiving unit 72 includes the communication section 41 as a main component, and receives the video data transferred from the main projector 1 (video data transfer unit 64). The sub video data output unit 73 includes the light valve driving section 45, the lamp driving section 46, the projection optical section 47, and the speaker 44 as the main components, and performs output (image projection and sound output) of the video data at the timing when the video data is received by the video data receiving unit 72.

In this embodiment, the transmission and reception of the above-described synchronization signal and response signal, and the obtaining of the transmission and reception time may be realized using a Ping command. That is, the main projector 1 performs (issues) the Ping command, to transmit an "echo request" packet (synchronization signal) to each sub projector 2 and receive an "echo reply" packet (response signal) from each sub projector 2. A round trip time at this time is obtained as the transmission and reception time. Specifically, the Ping command is performed (packet transmission and reception) over a plurality of times (for example, 4 to 5 times), and an average time of the round trip time is obtained as the transmission and reception time.

Further, each process through the above-described main synchronization signal transmitting and receiving unit 61, the transmission and reception time obtaining unit 62, the synchronization time calculating unit 63, and the sub synchronization signal transmitting and receiving unit 71 is repeatedly performed at a predetermined time interval (for example, time interval of 10 or 30 minutes, which will be hereinafter referred to as "re-synchronization adjustment time"). That is, a new synchronization adjustment time is calculated at the time interval set as the re-synchronization adjustment time. Further, instead of the case where the synchronization adjustment time is regularly and automatically recalculated as described above, in a case where a user manipulates the synchronization switch 18b, the synchronization adjustment time is similarly recalculated using this manipulation as a trigger. Thus, when images and sounds are synchronously output in the plurality of projectors 1 and 2, for example, even if the load or situation of the network NW is changed and a delay is generated in the output timing of the video data, it is possible to appropriately perform adjustment (correction). As a result, it is possible to suppress the timing delay of the image projection or the sound output in the plurality of projectors 1 and 2.

Figure 5:
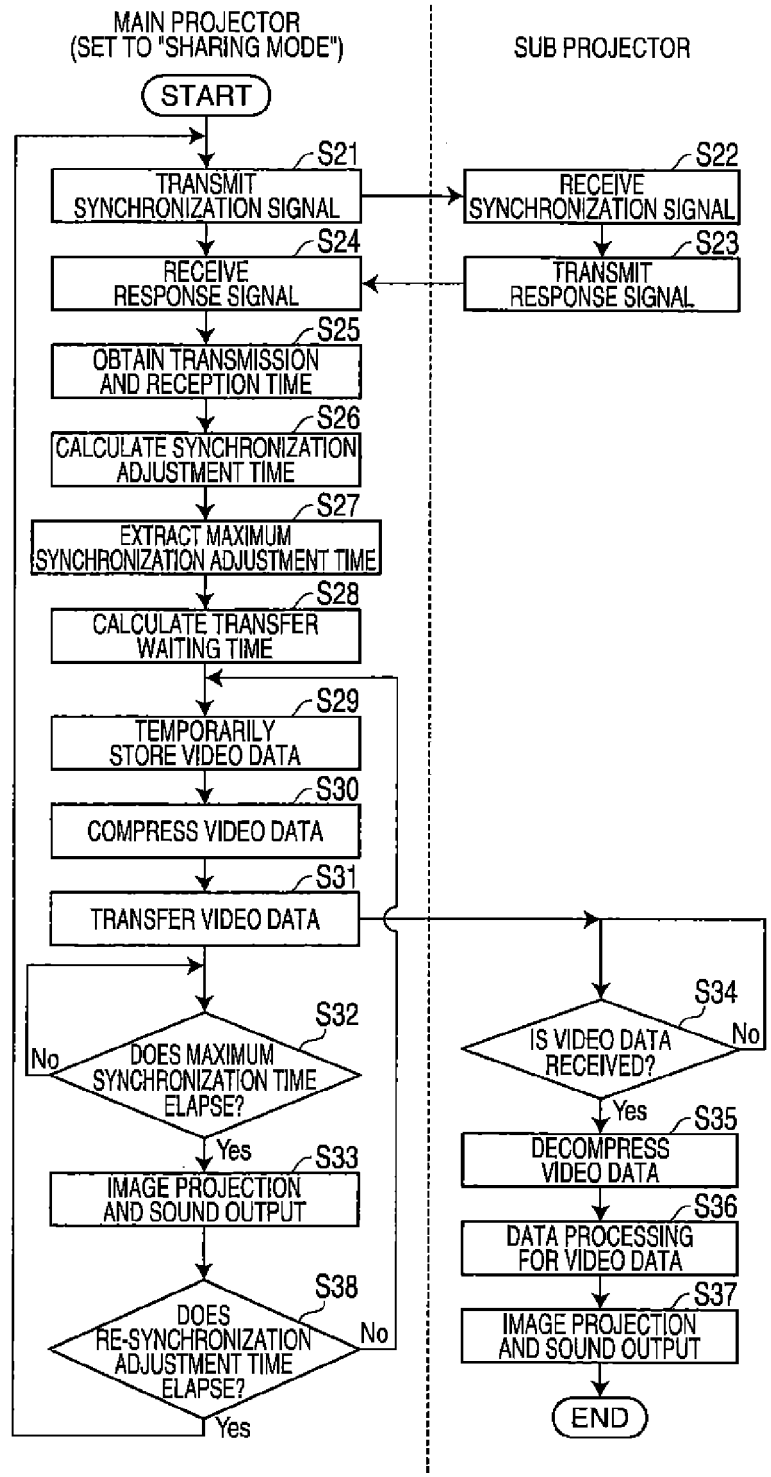
FIG. 5 is a flowchart illustrating a video projection operation in a case where two projectors (main projector and one sub projector) are present in the projector system according to the second embodiment of the invention.
Figure 6:
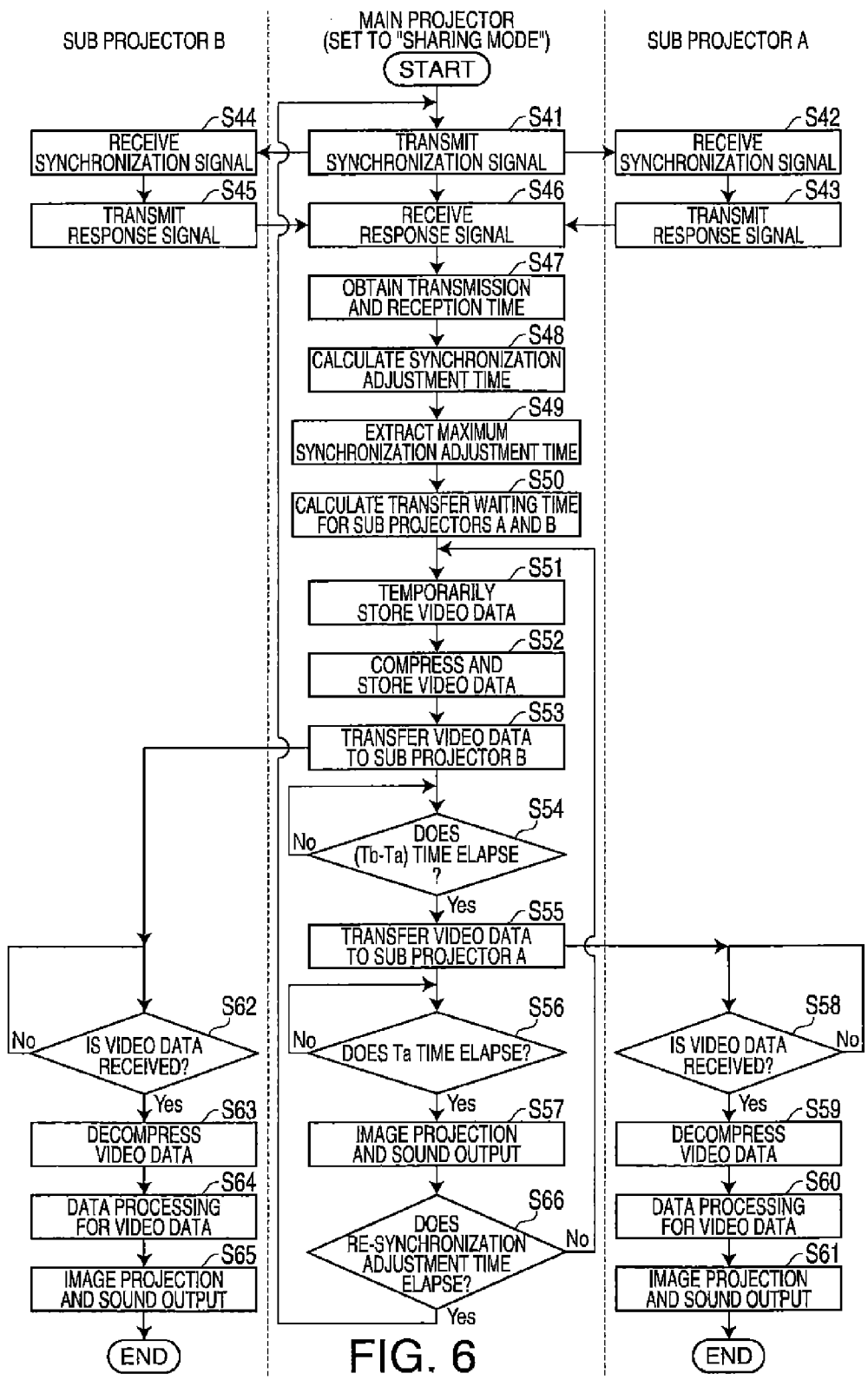
FIG. 6 is a flowchart illustrating a video projection operation in a case where three projectors (main projector and two sub projectors) are present in the projector system according to the second embodiment of the invention.

Here, a video output process of the projector system SY2 according to the second embodiment will be described with reference to flowcharts in FIGS. 5 and 6. This process is a process of synchronizing the video output timings in all the projectors 1 and 2. FIG. 5 is a process flow in a case where two projectors are present (main projector 1 and one sub projector 2), and FIG. 6 is a process flow in a case where three projectors are present (main projector 1 and two sub projectors 2).

Firstly, the flowchart of FIG. 5 will be described. The video data which is an output target is input from the video data input section 11 from time to time, and is data-processed by the video data processing section 12. Further, it is assumed that the mode of the main projector 1 is set as the "sharing mode" (the same as in FIG. 6). In a case where the mode is the "single mode", the same processes as the processes of S04 and S05 in FIG. 2 are performed.

Firstly, if the video data is input (data input process) and the data is processed, in a state where the mode of the main projector 1 is set as the "sharing mode", the main projector 1 transmits the synchronization signal to the sub projector 2 (S21, synchronization signal transmitting and receiving process). If the synchronization signal is received from the main projector 1 (S22), the sub projector 2 returns a response signal for this signal to the main projector 1 (S23). Then, if the response signal is received from the sub projector 2 (S24, synchronization signal transmitting and receiving process), the main projector 1 obtains the transmission and reception time taken for the reception of the response signal from the transmission of the synchronization signal (S25, transmission and reception time obtaining process), and calculates the synchronization adjustment time (half the transmission and reception time) on the basis of the obtained transmission and reception time (S26, synchronization adjustment time calculating process).

Next, the main projector 1 extracts the maximum synchronization adjustment time from the calculated synchronization adjustment time (S27). This extraction is performed using a Max function, for example. Here, since there is one sub projector 2, the synchronization adjustment time equals to the maximum synchronization adjustment time. Then, the main projector 1 calculates a transfer waiting time to the sub projector 2 (S28). Here, since the synchronization adjustment time equals to the maximum synchronization adjustment time, the transfer waiting time for the corresponding sub projector 2 becomes "0".

Next, the main projector 1 captures the video data after being processed (image data and sound data after being processed) and temporarily stores it in the video data temporary storage section 13 (S29, temporary storing process). Then, the main projector 1 compresses the video data stored in the video data temporary storage section 13 by the video data compressing section 21 (S30), and transfers the compressed video data to the sub projector 2 through the communication section 20 (S31, data transfer process). That is, in a case where there is one sub projector 2, since the synchronization adjustment time equals to the maximum synchronization adjustment time in step S27 and the transfer waiting time to the sub projector 2 becomes "0" in step S28, the main projector 1 performs the process of S30, and then immediately performs the transfer of the video data to the sub projector 2.

Next, the main projector 1 waits for the output of the video data from the main projector 1 until the maximum synchronization adjustment time (synchronization adjustment time) elapses after the video data is transferred to the sub projector 2 (S32: No). After the maximum synchronization adjustment time elapses (S32: Yes), the main projector 1 projects the image onto the screen SC on the basis of the video data stored in the video data temporary storage section 13, and outputs the sound in synchronization with the image projection (S33, data output process, first data output process).

On the other hand, if the video data is received from the main projector 1 (S34: Yes, data receiving process), the sub projector 2 decompresses the video data (compressed image data and compressed sound data) by the video data decompressing section 42 (S35), and performs data processing for the decompressed video data (image data and sound data) by the video data processing section 43 (S36). Thereafter, the sub projector 2 projects the image data after being processed onto the screen SC, and outputs sounds based on the sound data after being processed in synchronization with the image projection (S37, second data output process). That is, as the main projector 1 waits for the output of the image data by the maximum synchronization adjustment time, the video output from the main projector 1 is performed at the time when the sub projector 2 receives the video data, and thus, the video output from the main projector 1 and the video output from the sub projector 2 are synchronously (approximately at the same time) performed.

Further, after the process of S33, the main projector 1 determines whether the re-synchronization adjustment time which is set in advance elapses, and repeats the processes after S29 (processes relating to the output of the video data) in a case where the time does not elapse (S38: No). On the other hand, in a case where the re-synchronization adjustment time elapses (S38: Yes), the main projector 1 performs the processes in step S21 and thereafter, that is, the processes of recalculating the synchronization adjustment time. In this case (S38: Yes), a counter of the re-synchronization adjustment time is reset.

Next, the process flow in a case where three projectors (main projector and two sub projectors 2) are present will be described with reference to FIG. 6. The same procedure as this flow may be applied to a case where three or more sub projectors 2 are present. Further, in this flow, for ease of description, it is assumed that two sub projectors 2 are a sub projector A and a sub projector B, a synchronization adjustment time of the sub projector A is a synchronization adjustment time Ta, and a synchronization adjustment time of the sub projector B is a synchronization adjustment time Tb. Further, it is assumed that the relationship of "synchronization adjustment time Ta<synchronization adjustment time Tb" is established.

Firstly, if the video data is input (data input process) and the data is processed, in a state where the mode of the main projector 1 is set as the "sharing mode", the main projector 1 transmits the synchronization signal to the sub projectors A and B (S41, synchronization signal transmitting and receiving process). If the synchronization signal is received from the main projector 1 (S42 and S44), the sub projectors A and B return a response signal for this signal to the main projector 1 (S43 and S45). Then, if the response signal is respectively received from the sub projectors A and B (S46, synchronization signal transmitting and receiving process), the main projector 1 obtains the transmission and reception time taken for the reception of the response signal from the transmission of the synchronization signal for the projectors A and B (S47, transmission and reception time obtaining process), and calculates the synchronization adjustment times for the sub projectors A and B (synchronization adjustment time Ta=half the transmission and reception time for the sub projector A, and synchronization adjustment time Tb=half the transmission and reception time for the sub projector B) on the basis of the obtained transmission and reception time (S48, synchronization adjustment time calculating process).

Next, the main projector 1 extracts the maximum synchronization adjustment time from the calculated synchronization adjustment times Ta and Tb (S49). Here, the synchronization adjustment time Tb is obtained as the maximum synchronization adjustment time. Next, the main projector 1 calculates transfer waiting times to the sub projectors A and B (S50). Here, the transfer waiting time for the sub projector A is calculated as "maximum synchronization adjustment time Tb−synchronization adjustment time Ta". On the other hand, the transfer waiting time for the sub projector B is calculated as "maximum synchronization adjustment time Tb−synchronization adjustment time Tb=0".

Next, the main projector 1 captures the video data after being processed and temporarily stores it in the video data temporary storage section 13 (S51, temporary storing process). Then, the main projector 1 compresses the video data stored in the video data temporary storage section 13 by the video data compressing section 21, and stores the compressed video data in the video data temporary storage section 13 (S52). The storage of the compressed video data is performed in a case where two or more sub projectors 2 which transfer the video data are present, and at this time, the compressed video data is stored in a region different from that of the video data (not compressed video data) stored in step S51.

Next, the main projector 1 starts the transfer process of the video data for the sub projectors A and B, on the basis of the transfer waiting times calculated in step S50. In this case, the main projector 1 firstly transfers the compressed video data which is stored in the video data temporary storage section 13 to the sub projector B in which the transfer waiting time is "0" (S53, data transfer process). Further, after the transfer is terminated, the main projector 1 waits until "maximum synchronization adjustment time Tb−synchronization adjustment time Ta" which is the transfer waiting time of the sub projector A elapses (S54: No). When "maximum synchronization adjustment time Tb−synchronization adjustment time Ta" elapses (S54: Yes), the main projector 1 transfers the compressed video data which is stored in the video data temporary storage section 13 to the sub projector A (S55, data transfer process).

Next, the main projector 1 determines whether the maximum synchronization adjustment time Tb elapses from the video data transfer time to the sub projector B, after the transfer of the video data to the sub projector A, and waits for the output of the video data from the main projector 1 until the time elapses. That is, here, since the waiting time of "maximum synchronization adjustment time Tb−synchronization adjustment time Ta" is generated in step S54, the main projector 1 waits until "maximum synchronization adjustment time Tb−(maximum synchronization adjustment time Tb−synchronization adjustment time Ta)=synchronization adjustment time Ta" elapses (S56: No). Then, after the synchronization adjustment time Ta elapses (S56: Yes), the main projector 1 projects the image onto the screen SC on the basis of the video data (not compressed) stored in the video data temporary storage section 13, and outputs the sound in synchronization with the image projection (S57, data output process, first data output process).

On the other hand, if the video data is received from the main projector 1 (S58: Yes, S62: Yes, data receiving process), the sub projectors A and B decompress the video data by the video data decompressing section 42 (S59 and S63), and perform data processing for the decompressed video data by the video data processing section 43 (S60 and S64). Thereafter, the sub projectors A and B project the image data after being processed onto the screen SC, and output the sound based on the sound data after being processed in synchronization with the image projection (S61 and S65, second data output process). That is, as the main projector 1 delays the data transfer timing to the sub projector A, the sub projectors A and B receive the video data at the same timing, and wait for the output of the video data from the main projector 1 by the maximum synchronization adjustment time Tb. Thus, since the video output from the main projector 1 is performed at the time when the sub projectors A and B receive the video data, the video output from the main projector 1 and the video output from the sub projectors A and B are synchronously (approximately at the same time) performed.

Further, after the process of step S57, the main projector 1 determines whether the re-synchronization adjustment time which is set in advance elapses, and repeats the processes in step S51 and thereafter (processes relating to the output of the video data) in a case where the time does not elapse (S66: No). On the other hand, in a case where the re-synchronization adjustment time elapses (S66: Yes), the main projector 1 performs the processes in step S41 and thereafter, that is, the processes of recalculating the synchronization adjustment time. In this case (S66: Yes), a counter of the re-synchronization adjustment time is reset.

In a case where the synchronization switch 18*b* is manipulated by a user at an arbitrary timing during the processes in FIGS. 5 and 6, the main projector 1 and the sub projectors 2 perform the processes of steps S21 to S28 in FIG. 5 or the processes of steps S41 to S50 in FIG. 6, using the manipulation of the synchronization switch 18*b* as a trigger, to newly calculate the synchronization adjustment time and the transfer waiting time.

As described above, according to the second embodiment, the time (data transmission time) taken for the data transmission which becomes the cause of the time lag of the video data output in each sub projector 2 is obtained on the basis of the time taken for the data transmission and reception between the main projector 1 and each sub projector 2, to calculate the synchronization adjustment time in consideration of the time. Further, the video data output from the main projector 1 is delayed by the maximum time of all the calculated synchronization adjustment times (maximum synchronization adjustment time), and the video data is transmitted while delaying the transmission timing in the descending order of the synchronization adjustment time to each sub projector 2 (that is, in the descending order of the data transfer time). Thus, since the reception of the video data is completed approximately at the same time in each sub projector 2 and the main projector 1 outputs the video data at the timing when each sub projector 2 completely receives the video data, it is possible to adjust the video data output from all the projectors 1 and 2 to be synchronized. That is, it is possible to reduce the time lag of the video data output from all the projectors 1 and 2. Further, since only the main processor 1 performs the main processes, and each sub projector 2 does not necessarily perform a separate process, it is possible to simplify the processes.

In the second embodiment, the re-synchronization adjustment time is set in advance, but the invention is not limited thereto as, for example, a user may set the time. For example, as one of the manipulation items (manipulation menu) in the manipulation section 18, a re-synchronization adjustment time setting item (timing setting section) may be provided, and a user may select a time from a predetermined setting time list (10 minutes, 15 minutes, 30 minutes, or the like) for setting, or a user may directly input a time for setting. Thus, since the user can adjust the time according to usage environments of the projectors 1 and 2 (usage times, network environments, or the like of the projectors 1 and 2) or preferences of the user, it is possible to enhance user convenience.

Further, in the second embodiment, the synchronization adjustment time is calculated as half the transmission and reception time of the synchronization signal, that is, the transfer time taken for the data transfer for each sub projector 2, but the invention is not limited thereto. For example, the synchronization adjustment time may be calculated in consideration of the time lag due to the processing times of the decompression process and the data processing performed after the sub projector 2 receives the video data, in addition to the above-described time.

Third Embodiment

Figure 8:
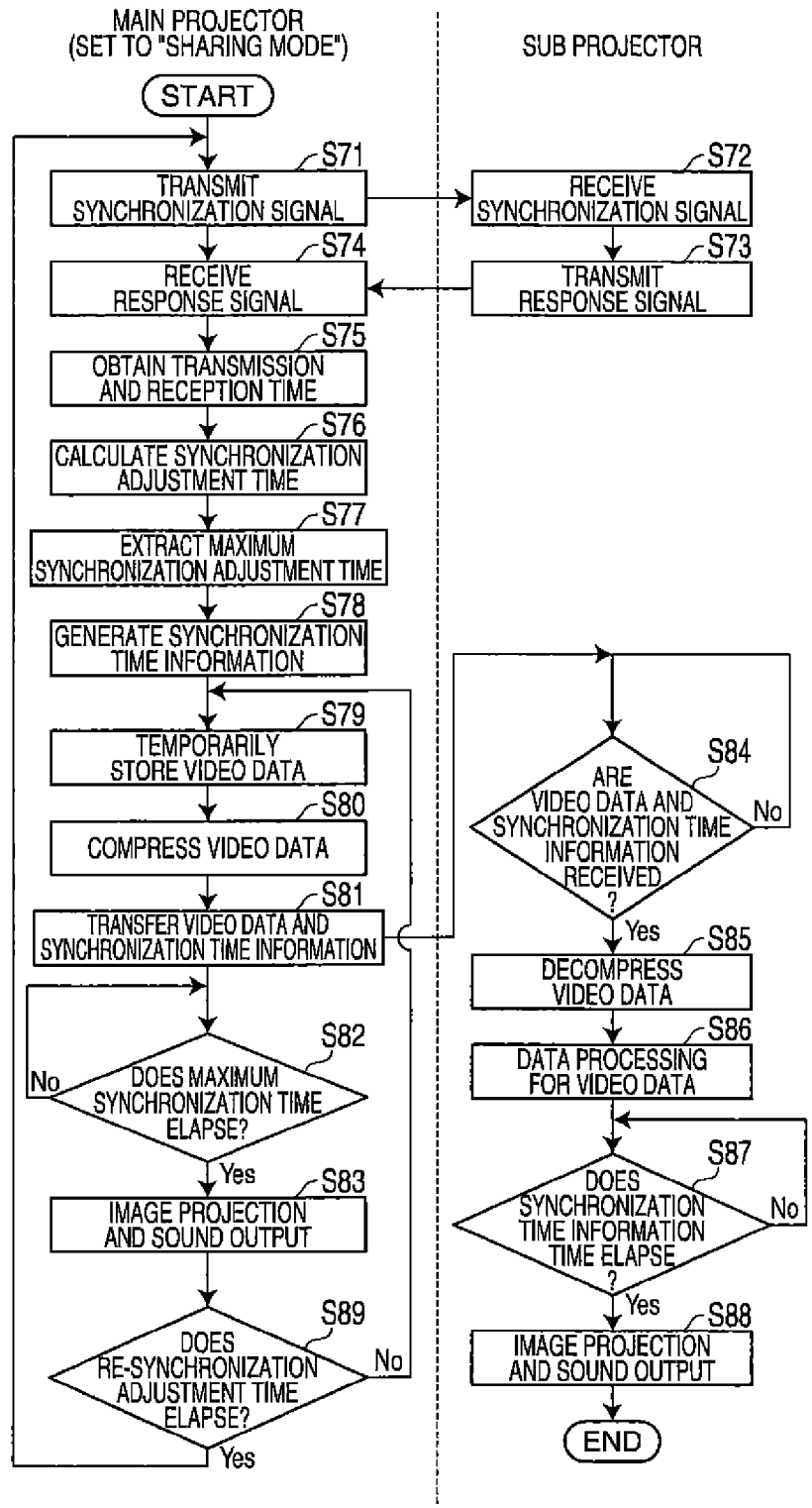
FIG. 8 is a flowchart illustrating a video projection operation in a case where two projectors (main projector and one sub projector) are present in the projector system according to the third embodiment of the invention.
Figure 9:
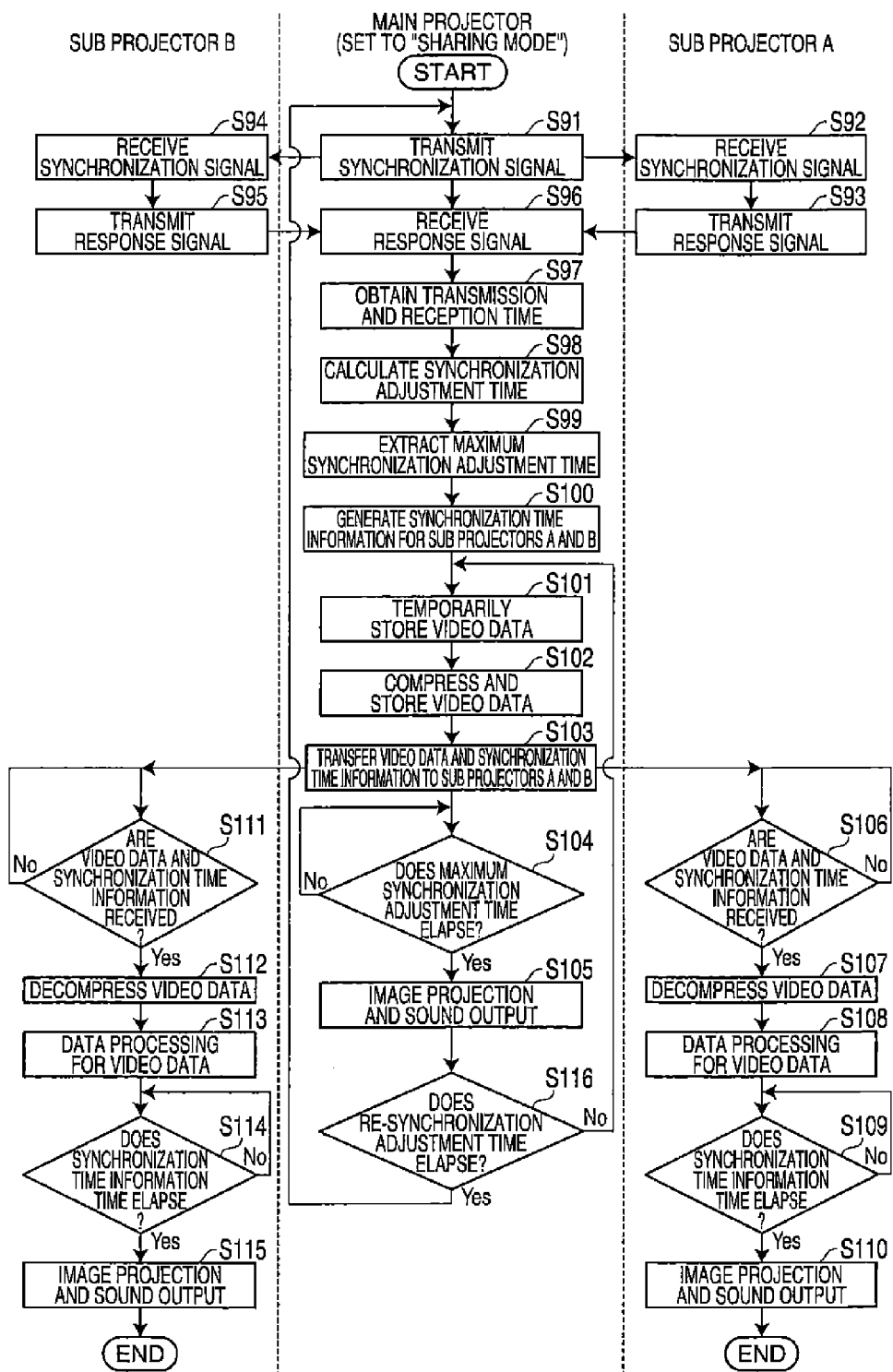
FIG. 9 is a flowchart illustrating a video projection operation in a case where three projectors (main projector and two sub projectors) are present in the projector system according to the third embodiment of the invention.

Next, a video output process in a projector system SY3 according to a third embodiment of the invention will be described with reference to FIGS. 7 to 9. A basic device configuration in the projector system SY3 according to the third embodiment is the same as the projector system SY2 according to the second embodiment (see FIG. 3), but a method of synchronizing output timings of the video data in the main projector 1 and each sub projectors 2 is different from the projector systems SY1 and SY2 in the first embodiment and the second embodiment. Specifically, this embodiment is different from the first and second embodiments in that the main projector 1 and each sub projector 2 adjust output timings of the video data and the timings of the image projection and the sound output in the main projector 1 and each sub projector 2 are synchronized. The other configuration of the third embodiment is the same as in the projector systems SY1 and SY2 in the first and second embodiments.

Figure 4:
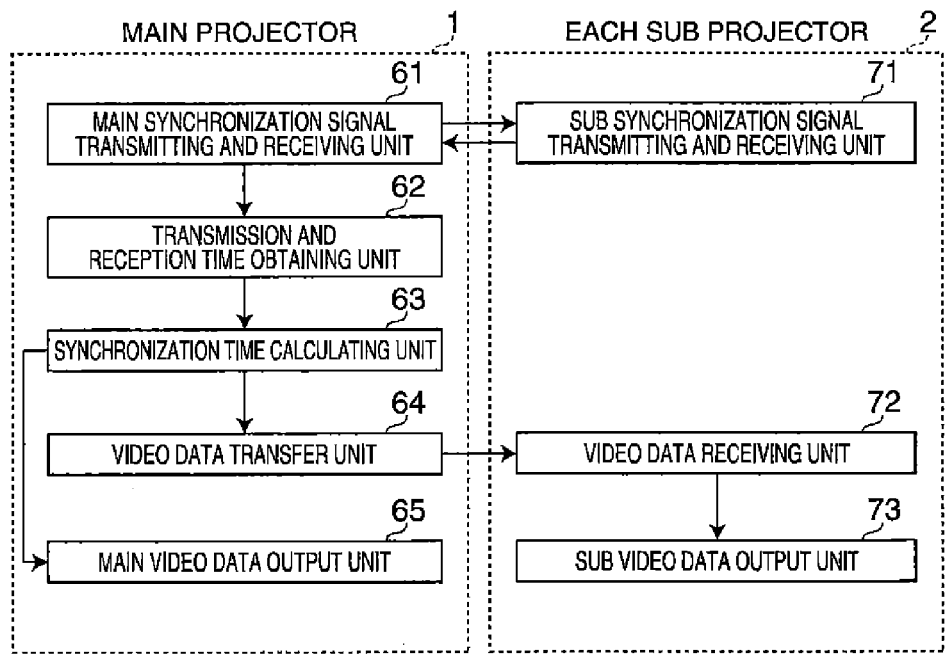
FIG. 4 is a functional block diagram illustrating functions in a synchronization process according to the second embodiment of the invention.
Figure 7:
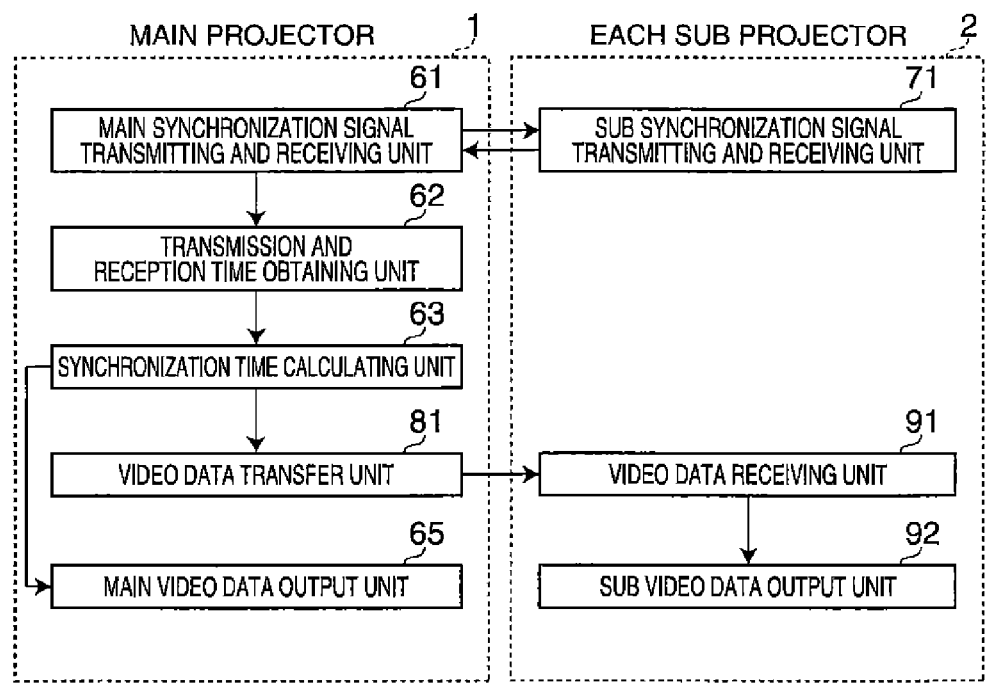
FIG. 7 is a functional block diagram illustrating functions in a synchronization process according to the third embodiment of the invention.

In FIG. 7, the same elements as in the second embodiment are given the same reference numerals in FIG. 4, and detailed description thereof will be omitted. Further, modifications applied to the same configuration as in the first and second embodiments are similarly applied to the present embodiment. Hereinafter, the differences in configurations will be mainly described.

Firstly, functions in a synchronization process in the main projector 1 and the sub projector 2 in the projector system SY3 according to the third embodiment will be described with a functional block diagram in FIG. 7. The main projector 1 includes a main synchronization signal transmitting and receiving unit 61, a transmission and reception time obtaining unit 62, a synchronization time calculating unit 63, a video data transfer unit 81 (data transfer section), and a main video data output unit 65. Since the main synchronization signal transmitting and receiving unit 61, the transmission and reception time obtaining unit 62, the synchronization time calculating unit 63, and the main video data output unit 65 are the same as the respective unit in the second embodiment, detailed description thereof will be omitted.

The video data transfer unit 81 includes the synchronization processing section 55 and the communication section 20 as the main components, and transfers the video data and information (synchronization time information) for performing synchronization adjustment of the output timing of the video data in each sub projector 2 to each sub projector 2. Specifically, the video data transfer unit 81 extracts the longest synchronization adjustment time (maximum synchronization adjustment time) from synchronization adjustment times calculated for the sub projectors 2, and transfers the time obtained by subtracting the synchronization adjustment time calculated for each sub projector 2 from the maximum synchronization adjustment time as a waiting time when the video data is output in each sub projector 2. That is, synchronization time information indicating that the waiting time is "0" is transferred to the sub projector 2 in which the synchronization adjustment time is the maximum, and synchronization time information indicating that the waiting time is "maximum synchronization adjustment time−synchronization adjustment time of each sub projector 2" is transferred to the different sub projector 2.

On the other hand, the sub projector 2 includes a sub synchronization signal transmitting and receiving unit 71, a video data receiving unit 91 (data receiving section), and a sub video data output unit 92 (second data output section). Since the sub synchronization signal transmitting and receiving unit 71 is the same as in the second embodiment, detailed description thereof will be omitted. The video data receiving unit 91 includes a communication section 41 as a main component, and receives the video data and synchronization time information transferred from the main projector 1 (video data transfer unit 81). The sub video data output unit 92 includes a synchronization processing section 56, a light valve driving section 45, a lamp driving section 46, a projection optical section 47, and a speaker 44 as the main components, and adjusts (delays) output timing of the video data on the basis of the synchronization time information received by the video data receiving unit 91, to perform output (image projection and sound output) of the video data.

Here, a video output process of the projector system SY3 according to the third embodiment will be described with reference to flowcharts in FIGS. 8 and 9. This process is a process of synchronizing the video output timings in all the projectors 1 and 2. FIG. 8 is a process flow in a case where two projectors are present (main projector 1 and one sub projector 2), and FIG. 9 is a process flow in a case where three projectors are present (main projector 1 and two sub projectors 2).

Firstly, the flowchart of FIG. 8 will be described. It is assumed that the video data which is an output target is input from the video data input section 11 from time to time, and is data-processed by the video data processing section 12. Further, it is assumed that the mode of the main projector 1 is set as the "sharing mode" (the same as in FIG. 9). In a case where the mode is the "single mode", the same processes as the processes of S04 and S05 in FIG. 2 are performed.

Firstly, if the video data is input and the data is processed, in a state where the mode of the main projector 1 is set as the "sharing mode", the main projector 1 transmits the synchronization signal to the sub projector 2 (S71). If the synchronization signal is received from the main projector 1 (S72), the sub projector 2 returns a response signal for this signal to the main projector 1 (S73). Then, if the response signal is received from the sub projector 2 (S74), the main projector 1 obtains the transmission and reception time taken for the reception of the response signal from the transmission of the synchronization signal (S75), and calculates the synchronization adjustment time (half the transmission and reception time) on the basis of the obtained transmission and reception time (S76). Next, the main projector 1 extracts the maximum synchronization adjustment time from the calculated synchronization adjustment time (S77). Here, since there is one sub projector 2, the maximum synchronization adjustment time equals to the synchronization adjustment time.

Next, the main projector 1 generates synchronization time information for adjustment of the video output timing in the sub projector 2, on the basis of the calculated synchronization adjustment time and maximum synchronization adjustment time (S78). Here, since the synchronization adjustment time equals to the maximum synchronization adjustment time, the information "waiting time=0 (maximum synchronization adjustment time−synchronization adjustment time)" is described in the synchronization time information. Next, the main projector 1 captures the video data after being processed and temporarily stores it in the video data temporary storage section 13 (S79). Then, the main projector 1 compresses the video data stored in the video data temporary storage section 13 by the video data compressing section 21 (S80), and transfers the compressed video data and the synchronization time information to the sub projector 2 (S81).

Next, after the video data and the synchronization time information are transferred to the sub projector 2, the main projector 1 waits (stops) for the output of the video data from the main projector 1 until the maximum synchronization adjustment time (=synchronization adjustment time) elapses (S82: No). After the maximum synchronization adjustment time elapses (S82: Yes), the main projector 1 projects the image onto the screen SC on the basis of the video data stored in the video data temporary storage section 13, and outputs the sound in synchronization with the image projection (S83).

On the other hand, if the video data and the synchronization time information are received from the main projector 1 (S84: Yes), the sub projector 2 decompresses the video data by the video data decompressing section 42 (S85), and performs data processing for the decompressed video data by the video data processing section 43 (S86). Thereafter, the sub projector 2 waits for the output of the video data until the time obtained as the synchronization time information elapses (S87: No). After the time elapses (S87: Yes), the sub projector 2 projects the image data after being processed onto the screen SC, and outputs sounds based on the sound data after being processed in synchronization with the image projection (S88). Here, since the time obtained as the synchronization time information is "0", the sub projector 2 finishes the process of step S86, and then immediately outputs the video data.

Further, after the process of S83, the main projector 1 determines whether the re-synchronization adjustment time which is set in advance elapses, and repeats the processes after S79 (processes relating to the output of the video data) in a case where the time does not elapse (S89: No). On the other hand, in a case where the re-synchronization adjustment time elapses (S89: Yes), the main projector 1 performs the processes in step S71 and thereafter, that is, the processes of recalculating the synchronization adjustment time and the synchronization time information. In this case (S89: Yes), a counter of the re-synchronization adjustment time is reset.

Next, the process flow in a case where three projectors (main projector 1 and two sub projectors 2) are present will be described with reference to FIG. 9. The same procedure as this flow may be applied to a case where three or more sub projectors 2 are present. Further, in this flow, for ease of description, it is assumed that two sub projectors 2 are a sub projector A and a sub projector B, a synchronization adjustment time of the sub projector A is a synchronization adjustment time Ta, and a synchronization adjustment time of the sub projector B is a synchronization adjustment time Tb. Further, it is assumed that the relationship of "synchronization adjustment time Ta<synchronization adjustment time Tb" is established.

Firstly, if the video data is input and the data is processed, in a state where the mode of the main projector 1 is set as the "sharing mode", the main projector 1 transmits the synchronization signal to the sub projectors A and B (S91). If the synchronization signal is received from the main projector 1 (S92 and S94), the sub projectors A and B return a response signal for this signal to the main projector 1 (S93 and S95). Then, if the response signal is respectively received from the sub projectors A and B (S96), the main projector 1 obtains the transmission and reception time taken for the reception of the response signal from the transmission of the synchronization signal for the projectors A and B (S97), and calculates the synchronization adjustment times for the sub projectors A and B (synchronization adjustment time Ta=half the transmission and reception time for the sub projector A, and synchronization adjustment time Tb=half the transmission and reception time for the sub projector B) on the basis of the obtained transmission and reception time (S98).

Next, the main projector 1 extracts the maximum synchronization adjustment time (here, synchronization adjustment time Tb) from the calculated synchronization adjustment times Ta and Tb (S99). The main projector 1 then generates the synchronization time information for adjustment of the video output timings in the sub projectors A and B (S100). Here, the synchronization time information for the sub projector A becomes "maximum synchronization time Tb−synchronization adjustment time Ta". On the other hand, the synchronization time information for the sub projector B becomes "maximum synchronization adjustment time Tb−synchronization adjustment time Tb=0".

Next, the main projector 1 captures the video data after being processed and temporarily stores the data in the video data temporary storage section 13 (S101). Then, the main projector 1 compresses the video data stored in the video data temporary storage section 13 by the video data compressing section 21, and stores the compressed video data in the video data temporary storage section 13 (S102). The storage of the compressed video data is performed in a case where two or more sub projectors 2 which transfer the video data are present, and at this time, the compressed video data is stored in a region different from that of the video data (non-compressed video data) stored in step S101.

Next, the main projector 1 transfers the video data and the synchronization time information to the sub projectors A and B (S103). Further, after the video data and the synchronization time information are transferred to the sub projectors A and B, the main projector 1 waits for the output of the video data from the main projector 1 until the maximum synchronization adjustment time Tb elapses (S104: No). Then, after the maximum synchronization adjustment time Tb elapses (S104: Yes), the main projector 1 projects the image onto the screen SC on the basis of the video data (not compressed) which is stored in the video data temporary storage section 13, and outputs sounds in synchronization with the image projection (S105).

On the other hand, if the video data and the synchronization time information are received from the main projector 1 (S106: Yes, S111: Yes), the sub projectors A and B decompress the video data by the video data decompressing section 42 (S107 and S112), and perform data processing for the decompressed video data by the video data processing section 43 (S108 and S113). Thereafter, the sub projectors A and B wait for the output of the video data until the time obtained as each piece of synchronization time information elapses (S109: No, S114: No), and if the time elapses (S109: Yes, S114: Yes), the sub projectors A and B project the image data after being processed onto the screen SC, and output the sound based on the sound data after being processed in synchronization with the image projection (S110 and S115). Here, the sub projector A outputs the video data after waiting for the time of "maximum synchronization adjustment time Tb−synchronization adjustment time Ta" after the process of step S108, and the sub projector B outputs the video data immediately after the process of step S113 since the synchronization time information is "0". That is, as the main projector 1 and the sub projector A delay the video output timing, since the video outputs from the main projector 1 and the sub projector A are performed at the time when the sub projector B receives the video data, as a result, the video output from the main projector 1 and the video outputs from the sub projectors A and B are synchronously (approximately at the same time) performed.

Further, after the process of step S105, the main projector 1 determines whether the re-synchronization adjustment time which is set in advance elapses, and repeats the processes in step S101 and thereafter (processes relating to the output of the video data) in a case where the time does not elapse (S116: No). On the other hand, in a case where the re-synchronization adjustment time elapses (S116: Yes), the main projector 1 performs the processes in step S91 and thereafter, that is, the processes of recalculating the synchronization adjustment time and the synchronization time information. In this case (S116: Yes), a counter of the re-synchronization adjustment time is reset.

As described above, according to the third embodiment, the main projector 1 transmits the video data and the synchronization time information to each sub projector 2, and each sub projector 2 adjusts the output timing of the video data in consideration of the synchronization time information, and thus, it is possible to reduce the time lag of the video data outputs of all the projectors 1 and 2. That is, the main projector 1 delays the output timing of the video data by the maximum synchronization adjustment time, and each sub projector 2 delays the output timing of the video data by the time (synchronization time information) until all the other sub projectors 2 completely receive the video data, and thus, it is possible to adjust for the data outputs from all the projectors 1 and 2 to be synchronized, and to reduce the time lag when the video data is output. Further, the main projector 1 only has to transmit the video data and the synchronization time information to each sub projector 2, and thus, in particular, in a case where the number of the sub projectors 2 is large, it is possible to reduce the processing load of the main projector 1, compared with the method according to the second embodiment.

In the first to third embodiments, after the predetermined image processing and sound processing are performed for the video data in the main projector 1, the video data is transferred to the sub projector 2, but the video data may be transferred without the image processing and sound processing, and the predetermined image processing and sound processing may be performed in the projectors 1 and 2.

Further, in the first to third embodiments, the plurality of sub projectors 2 is provided, but one sub projector 2 may be provided.

Further, in the first to third embodiments, the main projector 1 and the sub projector 2 are connected through the network NW, but the main projector 1 and the sub projector 2 may be directly connected through a cable.

Furthermore, in the first to third embodiments, the video data is unilaterally transferred from the main projector 1, and the video data input to the main projector 1 is projected (output) in conjunction therewith. However, the function of the sub projector 2 is installed to the main projector 1, and the function of the main projector 1 is installed to the sub projector 2, and thus, the video data may be reciprocally transferred to the main projector 1 and the sub projector 2, and the video data input to the projectors 1 and 2 may be projected (output) in conjunction therewith.

The synchronization of the video output timings of the main projector 1 and each sub projector 2 may be realized by a method other than the methods according to the first to third embodiments (modifications). For example, an estimated output time in conjunction with the video data (sound data and image data) is transmitted to each sub projector 2 from the main projector 1, and thus, the data output may be performed according to the estimated output time in the projectors 1 and 2. The estimated output time is set to a time exceeding the maximum time lag in the plurality of sub projectors 2.

Further, the respective processes of the video output methods (flowcharts shown in the respective embodiments) of the projector systems SY1, SY2, and SY3 according to the embodiments may be provided as a program. Furthermore, the program may be stored and provided in a storage medium (not shown). As the recording medium, a CD-ROM, a flash ROM, a memory card (compact flash (registered trademark), smart media, memory stick, or the like), a Compact Disc, a magneto optical disc, a Digital Versatile Disc, a flexible disk, and the like may be used.

Further, instead of the above-described embodiments, it is possible to provide appropriate modifications for the device configurations, processing processes, or the like of the projector systems SY1, SY2, and SY3, in a range without departing from the scope of the invention.

Furthermore, in the above-described embodiments, the transmissive liquid crystal display method is used, but the projector PJ may employ a variety of display principles such as a reflective liquid crystal display method, a CRT display method, a light switch display method (micro mirror device method), or the like. In addition, it is possible to provide appropriate modifications in a range without departing from the scope of the invention.

The present application claim priority from Japanese Patent Application No. 2010-072421 filed on Mar. 26, 2010, and No. 2011-003729 filed on Jan. 12, 2011, which is hereby incorporated by reference in its entirety.

What is claimed is:

1. A projector comprising:
   a data input section which inputs data of an image and/or a sound;
   a data output section which outputs the input data;
   a data transfer section which captures the data before being output by the data output section, and transfers the captured data to at least one other projector;
   a temporary storage section which temporarily stores the input data;
   a synchronization signal transmitting and receiving section which transmits a synchronization signal for calculating a time taken for data transmission to the at least one other projector, and receives a response signal for the synchronization signal from the at least one other projector to which the synchronization signal is transmitted;
   a transmission and reception time obtaining section which obtains a transmission and reception time taken from the transmission of the synchronization signal to the reception of the response signal to the at least one other projector; and
   a synchronization adjustment time calculating section which calculates a synchronization adjustment time for synchronizing the data output from the at least one other projector, on the basis of the obtained transmission and reception time,
   wherein the data output section transfers the data by the data transfer section and then outputs the data input from the data input section;
   the data output section delays the data stored in the temporary storage section to be output by a predetermined time;
   the data output section delays the data stored in the temporary storage section using the maximum time out of all the synchronization adjustment times calculated by the synchronization adjustment time calculating section as the predetermined time, to be output, and when a time obtained by subtracting the synchronization adjustment time of the at least one other projector which is a transfer destination from the maximum time elapses, at the time of the transfer of the data to the at least one other projector, the data transfer section transfers the data to the at least one other projector which is the transfer destination.

2. The projector according to claim 1,
   wherein at the time of the transfer of the data to the at least one other projector, the data transfer section transfers a time obtained by subtracting the synchronization adjustment time of the at least one other projector which is the transfer destination from the maximum time as synchronization time information, in addition to the data, to the at least one other projector which is the transfer destination.

3. The projector according to claim 1,
   wherein the synchronization adjustment time calculating section calculates half the obtained transmission and reception time as the synchronization adjustment time.

4. The projector according to claim 1,
   wherein the synchronization signal transmitting and receiving section performs the transmission and reception of the synchronization signal and the response signal at a predetermined time interval,
   the transmission and reception time obtaining section obtains the transmission and reception time whenever the transmission and reception is performed by the synchronization signal transmitting and receiving section, and
   the synchronization adjustment time calculating section calculates the synchronization adjustment time on the basis of the transmission and reception time whenever the transmission and reception time is obtained.

5. The projector according to claim 4, further comprising a timing setting section which sets the predetermined time interval,
   wherein the synchronization signal transmitting and receiving section performs the transmission and reception of the synchronization signal and the response signal, at the time predetermined interval which is set by the timing setting section.

6. The projector according to claim 1, further comprising a synchronization manipulation section which manipulates performance of the transmission and reception of the synchronization signal and the response signal,
   wherein the synchronization signal transmitting and receiving section performs the transmission and reception of the synchronization signal and the response signal using the manipulation of the synchronization manipulation section as a trigger,
   the transmission and reception time obtaining section obtains the transmission and reception time whenever the transmission and reception is performed by the synchronization signal transmitting and receiving section in which the manipulation of the synchronization manipulation section is used as the trigger, and
   the synchronization adjustment time calculating section calculates the synchronization adjustment time on the basis of the transmission and reception time whenever the transmission and reception time is obtained.

7. The projector according to claim 1, wherein the at least one other projector projects the data in conjunction with the reception of the data from the projector.

8. The projector according to claim 1, further comprising a transfer switching section which switches the transfer of the data through the data transfer section.

9. The projector according to claim 1,
wherein the data input section includes an analog signal input section which inputs the data by an analog signal, and a digital signal input section which inputs the data by a digital signal, and
further comprising a digital converting section which converts the data input by the analog signal into a digital signal.

10. The projector according to claim 1, further comprising a data compressing section which compresses the data before the data is transferred through the data transfer section.

11. A projector system comprising a first projector and at least one second projector which is connected to the first projector, the first projector including:
   a data input section which inputs data of an image and/or a sound;
   a first data output section which outputs the input data;
   a data transfer section which captures the data before being output by the first data output section, and transfers the data to the at least one second projector;
   a temporary storage section which temporarily stores the input data;
   a synchronization signal transmitting and receiving section which transmits a synchronization signal for calculating a time taken for the data transmission to the at least one second projector, and receives a response signal for the synchronization signal from the at least one second projector to which the synchronization signal is transmitted;
   a transmission and reception time obtaining section which obtains a transmission and reception time taken from the transmission of the synchronization signal to the reception of the response signal to the at least one second projector; and
   a synchronization adjustment time calculating section which calculates a synchronization adjustment time for synchronizing the data output from the at least one second projector, on the basis of the obtained transmission and reception time,
   the at least one second projector each including:
      a data receiving section which receives the data transferred from the first projector; and
      a second data output section which outputs the data after receiving the data,
   wherein the first data output section transfers the data by the data transfer section and then outputs the data input from the data input section,
   the first data output section delays the data stored in the temporary storage section by the maximum time out of all the synchronization adjustment times calculated by the synchronization adjustment time calculating section, to be output, and
   when a time obtained by subtracting the synchronization adjustment time of the at least one second projector which is a transfer destination from the maximum time elapses, at the time of the transfer of the data to the at least one second projector, the data transfer section transfers the data to the at least one second projector which is the transfer destination.

12. A projector comprising:
   a data input section which inputs data of an image and/or a sound;
   a data output section which outputs the input data;
   a data transfer section which captures the data before being output by the data output section, and transfers the captured data to at least one other projector;
   a temporary storage section which temporarily stores the input data;
   a synchronization signal transmitting and receiving section which transmits a synchronization signal for calculating a time taken for the data transmission to the at least one other projector, and receives a response signal for the synchronization signal from the at least one other projector to which the synchronization signal is transmitted;
   a transmission and reception time obtaining section which obtains a transmission and reception time taken from the transmission of the synchronization signal to the reception of the response signal to the at least one other projector; and
   a synchronization adjustment time calculating section which calculates a synchronization adjustment time for synchronizing the data output from the at least one other projector, on the basis of the obtained transmission and reception time,
   wherein the data output section transfers the data by the data transfer section and then outputs the data input from the data input section;
   the data output section delays the data stored in the temporary storage section to be output by a predetermined time;
   the data output section delays the data stored in the temporary storage section using the maximum time out of all the synchronization adjustment times calculated by the synchronization adjustment time calculating section as the predetermined time, to be output, and
   at the time of the transfer of the data to the at least one other projector, the data transfer section transfers a time obtained by subtracting the synchronization adjustment time of the at least one other projector which is a transfer destination from the maximum time as synchronization time information, in addition to the data, to the at least one other projector which is the transfer destination.

13. A projector system comprising a first projector and at least one second projector which is connected to the first projector,
   the first projector including:
   a data input section which inputs data of an image and/or a sound;
   a first data output section which outputs the input data;
   a data transfer section which captures the data before being output by the first data output section, and transfers the data to the at least one second projector;
   a temporary storage section which temporarily stores the input data;
   a synchronization signal transmitting and receiving section which transmits a synchronization signal for calculating a time taken for the data transmission to the at least one second projector, and receives a response signal for the synchronization signal from the at least one second projector to which the synchronization signal is transmitted;
   a transmission and reception time obtaining section which obtains a transmission and reception time taken from the transmission of the synchronization signal to the reception of the response signal to the at least one second projector; and
   a synchronization adjustment time calculating section which calculates a synchronization adjustment time for synchronizing the data output from the at least one second projector, on the basis of the obtained transmission and reception time,
   the at least one second projector each including:
      a data receiving section which receives the data transferred from the first projector; and
      a second data output section which outputs the data after receiving the data, wherein the first data output section transfers the data by the data transfer section and then outputs the data input from the data input section, the first data output section delays the data stored in the temporary storage section by the maximum time out of all the synchronization adjustment times calculated by the synchronization adjustment time calculating section, to be output, at the time of the transfer of the data to the at least one second projector, the data transfer section transfers a time obtained by subtracting the synchronization adjustment time of the at least one second projector which is a transfer destination from the maximum time as synchronization time information, in addition to the data, to the at least one second projector which is the transfer destination, the data receiving section of the at least one second projector receives the data and the synchronization time information, and the second data output section outputs the data after a time indicated by the received synchronization time information elapses.

14. A data output method of a projector which can be connected with at least one other projector, comprising:

inputting data of an image and/or a sound;

outputting the input data;

capturing the data before being output in the outputting of the data, and transferring the captured data to the at least one other projector;

temporarily storing the input data in a temporary storage section;

transmitting a synchronization signal for calculating a time taken for the data transmission to the at least one other projector, and receiving a response signal for the synchronization signal from the at least one other projector to which the synchronization signal is transmitted;

obtaining a transmission and reception time from the transmission of the synchronization signal to the reception of the response signal to the at least one other projector; and calculating a synchronization adjustment time for synchronizing the data output from the at least one other projector on the basis of the obtained transmission and reception time, wherein the data stored in the temporary storage section is delayed by the maximum time out of all the synchronization adjustment times calculated in the calculating of a synchronization adjustment time, to be output, in the outputting of the input data, and when a time obtained by subtracting the synchronization adjustment time of the at least one other projector which is a transfer destination from the maximum time elapses, at the time of the transfer of the data to the at least one other projector, the data is transferred to the at least one other projector which is the transfer destinations in the capturing and transferring of the data.

* * * * *